US007111761B2

(12) United States Patent
Masuda

(10) Patent No.: US 7,111,761 B2
(45) Date of Patent: Sep. 26, 2006

(54) FLUID DISCHARGE PUMP AND FLUID CONTAINER

(76) Inventor: Masatoshi Masuda, 2, 9-banchi, Takada-Cho, Saiin, Ukyo-ku, Kyoto-city, Kyoto 615-0031 (JP)

( * ) Notice: Subject to any disclaimer, the term of this patent is extended or adjusted under 35 U.S.C. 154(b) by 161 days.

(21) Appl. No.: 10/874,460

(22) Filed: Jun. 23, 2004

(65) Prior Publication Data

US 2005/0000513 A1 Jan. 6, 2005

(30) Foreign Application Priority Data

Jul. 3, 2003 (JP) ............................ 2003-191198
Jul. 10, 2003 (JP) ............................ 2003-194908

(51) Int. Cl.
*G01F 11/32* (2006.01)

(52) U.S. Cl. .................................... 222/321.7; 222/387

(58) Field of Classification Search ............ 222/321.7, 222/321.9, 383.1, 387
See application file for complete search history.

(56) References Cited

U.S. PATENT DOCUMENTS 4,732,549 A 3/1988 Von Schuckmann
4,915,601 A 4/1990 Von Schuckmann
5,152,434 A 10/1992 Birmelin
5,518,147 A * 5/1996 Peterson et al. ....... 222/153.07
5,664,703 A 9/1997 Reifenberger et al.
6,536,630 B1 3/2003 Chan et al.
6,672,486 B1 * 1/2004 Santagiuliana .............. 222/207
2004/0007597 A1 * 1/2004 Masuzzo et al. ......... 222/321.9
2004/0055457 A1 3/2004 Masuda

FOREIGN PATENT DOCUMENTS

JP 03-000655 1/1991
JP 09-267855 A 10/1997
JP 10-094744 A 4/1998

* cited by examiner

*Primary Examiner*—Joseph A. Kaufman
(74) *Attorney, Agent, or Firm*—Knobbe, Martens, Olson & Bear LLP

(57) ABSTRACT

A fluid discharge pump comprises: an outer cover connected to an upper portion of the fluid-storing portion; a nozzle head provided with a fluid discharge nozzle; a bellows member disposed between the fluid-storing portion and the nozzle head; a first valve mechanism for inflow coupled with a lower end of the bellows member; a second valve mechanism for outflow coupled with an upper end of the bellows member; and a third valve mechanism for anti-leakage disposed between the nozzle and the second valve mechanism inside the nozzle head.

9 Claims, 33 Drawing Sheets

FLUID DISCHARGE PUMP AND FLUID CONTAINER

This is a U.S. patent application claiming foreign priority under 35 U.S.C. § 119 to Japanese Patent Application No. 2003-191198, filed Jul. 3, 2003, and No. 2003-194908, filed Jul. 10, 2003, the disclosure of which is herein incorporated by reference in their entirety.

BACKGROUND OF THE INVENTION

The invention relates generally to a fluid discharge pump for discharging a fluid stored inside a fluid-storing portion from a nozzle head disposed on the upper side of the fluid-storing portion by pressing the nozzle head. Further, the present invention relates to a fluid container for letting a fluid stored inside a fluid-storing portion flow out from a nozzle head disposed on the upper side of the fluid-storing portion by pressing the nozzle head.

As the above type of fluid discharge pump, Japanese Patent Laid-open No. 2001-213465 discloses a fluid discharge pump. However, in the fluid discharge pump, a fluid having flowed into a nozzle head may leak out even after removing pressure applied to the nozzle head. This type of phenomenon is a problem particularly when a resinous valve mechanism is used to reduce fluid discharge pump costs.

SUMMARY OF THE INVENTION

In one aspect, an object of the present invention is to provide a fluid discharge pump effectively preventing leaking out of a fluid from a container. In another aspect, an object of the present invention is to provide a fluid discharge pump accurately and reliably discharging a fluid from a container. Further, in still another aspect, an object of the present invention is to provide a fluid discharge pump or fluid container equipped with the pump at low cost, e.g., all of the parts are made of a resin. The present invention is not intended to be limited by the above objects, and various objects other than the above can be accomplished as readily understood by one of ordinary skill in the art. The embodiments described below use reference numbers used in the drawings solely for easy understanding, and the reference numbers are not intended to limit the scope of the invention.

In an embodiment, the present invention provides a fluid discharge pump (e.g., 10, 10') for discharging a fluid stored inside a fluid-storing portion (e.g., 40, 40'), comprising: (i) an outer cover (e.g., 30, 30', 30") being adapted to be connected to an upper portion (e.g., 45) of the fluid-storing portion and having a through-hole (e.g., 100) in its axis; (ii) a nozzle head (e.g., 20, 20') being provided with a fluid discharge nozzle (e.g., 21, 212) and being movable inside the cover in the axis; (iii) a first valve mechanism (e.g., 11, 11') for inflow adapted to be connected to an opening of the upper portion (e.g., 45) of the fluid-storing portion; (iv) a second valve mechanism (e.g., 12, 12') for outflow connected inside the nozzle head; (v) a bellows member (e.g., 16, 16') being connecting the first valve mechanism and the second valve mechanism and deforming from a stretched position (e.g., FIGS. 1, 3, 9, 11, 13, 15–19, 29, 32, 33) to a folded-up position (e.g., FIGS. 2, 10, 14, 28), thereby changing an amount of fluid in contact with and stored inside the bellows member, wherein when pressure inside the bellows member increases by downward movement of the nozzle head, the first valve mechanism closes and the second valve mechanism opens, and when pressure inside the bellows member decreases by upward movement of the nozzle head, the first valve mechanism opens and the second valve mechanism closes; (vi) a third valve mechanism (e.g., 13, 210) for anti-leakage disposed between the nozzle and the second valve mechanism inside the nozzle head, wherein when the second valve mechanism opens, the third valve mechanism opens, and when the second valve mechanism closes or is not in use, the third valve mechanism closes.

In the above, in an embodiment, the third valve mechanism may comprise: (I) a tubular member (e.g., 131) connecting the nozzle and the second valve mechanism in the nozzle head and having a flexion (e.g., 131*d*) flexed inward between the nozzle and the second valve mechanism; and (II) a contact portion (e.g., 132) being disposed inside the tubular member and having an upper end (e.g., 132*c*, 133*c*) fixed to the nozzle head and a lower end with an enlarged portion (e.g., 132*b*, 133*b*) which has a diameter larger than an inner diameter of the flexion and is in contact with the flexion to close the flexion, wherein when the nozzle head descends, the contact portion moves relative to the tubular member to be detached from the flexion to open the flexion.

In another embodiment, the third valve mechanism may be tubular and rotatable on its axis and constitute the nozzle (e.g., 212), said third valve mechanism comprising: (I) a cylindrical member (e.g., 210) having an opening (e.g., 211) on its inner wall, said opening being communicated with the second valve mechanism (e.g., 12') and closed when the cylindrical member rotates; and (II) a guiding member (e.g., 22) supporting the cylindrical member and guiding its rotation, said guiding member comprising a guiding portion (e.g., 223) for switching the opening and closing of the opening.

The above embodiments include, but are not limited to, the following embodiments:

The first, second, and third valve mechanism may be resinous. The first, second, and third valve mechanism may be resinous. These valve mechanisms may be constituted by any suitable material such as a resin, rubber, composite, etc. Preferably, these valve mechanisms may be constituted by a resin such as polypropylene or polyethylene, a resin containing a rubber material such as silicon rubber, a mixture of the foregoing, and the like. Hardness of the material can be adjusted by adjusting a ratio of a hard resin to a soft resin. All of the elements can be made of a resin, rubber, composite, or mixture thereof, and the hardness and elasticity of each can be adjusted depending on the function required for the element. For example, a bending or flexing portion (e.g., a valve body) can be made of a more flexible material than the other portions (e.g., a valve seat).

The bellows member may urge the nozzle head away from the first valve mechanism. The first valve mechanism may have an inflow opening (e.g., 111*a*) in a center. The second valve mechanism may have an outflow opening in a center (e.g., 121*a*). The second valve mechanism may have an outflow opening (e.g., 225) around a periphery area.

In another aspect, the present invention provides a fluid container comprising any of the fluid discharge pumps described above, and the fluid-storing portion (e.g., 40, 40'). The fluid-storing portion may have a bottom provided with a piston (e.g., 42) movable in its axis as pressure inside the fluid-storing portion decreases.

In still another embodiment, the present invention provides a fluid discharge pump (e.g., 10) for discharging a fluid stored inside a fluid-storing portion (e.g., 40), comprising: (i) a nozzle head (e.g., 20) disposed on an upper side of the fluid-storing portion, said nozzle head being pressed for discharging the fluid from the fluid-storing portion; (ii) a bellows member (e.g., 16) having an inflow opening (e.g.,

16*a*) and an outflow opening (e.g., 16*b*) and deforming from a stretched position (e.g., FIGS. 2, 10, 14) in which the bellows member holds a relatively large amount of fluid therein to a folded-up position (e.g., FIGS. 1, 3, 9, 11, 13, 15) in which the bellows member holds a relatively small amount of fluid therein when compressed by the nozzle head; (iii) a resinous inflow valve mechanism (e.g., 11; a first valve mechanism) coupled with the inflow opening of the bellows member; (iv) a resinous outflow valve mechanism (e.g., 12; a second valve mechanism) coupled with the outflow opening of the bellows member and capable of moving relatively to the nozzle head; (v) a tubular member (e.g., 131) having a first supporting portion (e.g., 131*a*) coupled with the nozzle head, a second supporting portion (e.g., 131*b*) coupled with the outflow valve mechanism, and a tubular coupling portion (e.g., 131*c*) in which a flexion (e.g., 131*d*) is formed and which couples the first supporting portion and the second supporting portion in a position in which momentum is given in a direction of the supporting portions separating from each other; and (vi) a contacting portion (e.g., 132) having a joined portion (e.g., 132*a*), one end of which is coupled with the nozzle head and which is inserted into the flexion of the tubular member, and a lid portion (e.g., 132*b*) formed at the other end of the joined portion and contacting a surface of the flexion (e.g., 131*c*) in the coupling portion of the tubular member, wherein the flexion in the tubular member and the lid portion in the contacting member separate from each other and a fluid flow path (e.g., 26) is formed, when the nozzle head descends against the outflow valve mechanism. The contacting portion and the tubular coupling portion constitute a third valve mechanism.

The above embodiment includes, but is not limited to, the following embodiments.

The inflow valve mechanism may comprise: (I) a valve seat member (e.g., 111) in which an opening portion (e.g., 111*a*) for letting the fluid flow in is formed; and (II) a valve member (e.g., 112) having an annular supporting portion (e.g., 112*b*) and a valve portion (e.g., 112*a*) connected to the supporting portion via multiple coupling portions (e.g., 112*c*).

The outflow valve mechanism may comprise: (I) a valve seat member (e.g., 122*e*) in which an opening (e.g., 121*a*) for letting the fluid flow out is formed; and (II) a valve member (e.g., 122) having an annular supporting portion (e.g., 122*b*) and a valve portion (e.g., 122*a*) connected to the supporting portion via multiple coupling portions (e.g., 122*c*).

The nozzle head may comprise stoppers (e.g., 23*a*, 23*b*) restricting a relative travel distance of the outflow valve mechanism.

In yet another embodiment, the present invention provides a fluid container comprising a fluid discharge pump (e.g., 10') for letting a fluid stored inside a fluid-storing portion (e.g., 40, 40') flow out from a nozzle head (e.g., 20') disposed on an upper side (e.g., 45) of the fluid-storing portion by pressing the nozzle head, said nozzle head comprising: (i) a tubular member (e.g., 210) having an inflow portion (e.g., 211) for letting the fluid flow in from the fluid discharge pump and an outflow portion (e.g., 212) for letting the fluid having flowed in from the inflow portion flow out, which is switchable between an open position (e.g., FIGS. 16, 17, 19, 28, 29, 32, 33) enabling the fluid to pass through between the inflow portion and the fluid discharge pump and a closed position (e.g., FIG. 18) shutting off the fluid passing through between the inflow portion and the fluid discharge pump; and (ii) a guiding member (e.g., 22') having a guiding portion (e.g., 223) supporting the tubular member (e.g., 210) and guiding a switchover between the open position and the closed position of the tubular member.

The above embodiment includes, but is not limited to, the following embodiments.

An opening portion (e.g., 111'*a*) communicated with the inflow portion of the tubular member in the open position may be formed in the guiding member.

The open position and the closed position may be switched by rotating the tubular member on its axis.

The guiding member may have a first regulating portion (e.g., 223*a*) for stopping a rotation of the tubular member in the open position and a second regulating portion (e.g., 223*b*) for stopping a rotation of the tubular member in the closed position.

The discharge pump may comprise a resinous inflow valve mechanism (e.g., 11') for letting the fluid stored in the fluid-storing portion flow in and a resinous outflow valve mechanism (e.g., 12') for letting the fluid having flowed in from the inflow valve mechanism flow out.

The fluid discharge pump may comprise a resinous bellows member having the inflow opening and outflow opening and deforming from a stretched position in which a relatively large amount of fluid is stored inside the bellows member to a folded-up position in which a relatively small amount of fluid is stored inside it with a pressure being applied to the nozzle head.

In all of the foregoing embodiments, any element used in an embodiment can interchangeably be used in another embodiment, and any combination of elements can be applied in these embodiments, unless it is not feasible.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

Explanation of symbols used is as follows: 10: Fluid discharge pump; 11: Inflow valve mechanism; 12: Outflow valve mechanism; 13: Leakage prevention mechanism; 16: Bellows member; 16*a*: Inflow opening; 16*b*: Outflow opening; 17: Packing; 20: Nozzle head; 21: Discharge portion; 22: Pushing portion; 23: Sliding area; 23*a*: Upper-limit stopper; 23*b*: Lower-limit stopper; 24: Joined portion; 25: Fixed portion; 30: Lid member; 40: Fluid-storing portion; 41: Cylinder member; 42: Piston member; 43: Inner lid; 43*a*: Air vent; 43*b*: Upper side of the bottom; 44: Outer lid; 44*a*: Hole; 111: Inflow valve seat member; 111*a*: Opening portion; 111*b*: Joined portion; 112: Inflow valve member; 112*a*: Valve body; 112*b*: Supporting portion; 112*c*: Coupling portion; 121: Outflow valve seat member; 121*a*: Opening portion; 121*b*: Concave portion; 121*c*: Guiding portion; 121*d*: Joined portion; 122: Outflow valve member; 122*a*: Valve body; 122*b*: Supporting portion; 122*c*: Coupling portion; 122*d*: Flexion; 122*e*: Convex portion; 131: Tubular member; 131*a*: First supporting portion; 131*b*: Second supporting portion; 131*c*: Coupling portion; 131*d*: Flexion; 132: Contacting member; 132*a*: Joined portion; 132*b*: Lid portion; 133: Contacting member; 133*a*: Joined portion; 133*b*: Lid portion; 10': Fluid discharge pump; 11': Inflow valve mechanism; 12': Outflow valve mechanism; 16': Bellows member; 16'*a*: Inflow opening; 16'*b*: Outflow opening; 17': Packing; 20': Nozzle head; 210: Cylindrical member; 22': Guiding member; 40': Fluid-storing portion; 41': Cylinder member; 42: Piston member; 43: Inner lid; 44: Outer lid; 111': Inflow valve seat member; 111'*a*: Opening portion; 111'*b*: Joined portion; 112': Inflow valve member; 112'*a*: Valve body; 112'*b*: Supporting portion; 112'*c*: Coupling portion; 121': Out flow valve seat member; 121'*a*: Opening portion; 121'*b* Joined portion; 121'*c*: Inflow portion; 122': Outflow valve member; 122'*a*: Valve body; 122'*b*: Base portion; 211: Inflow portion; 212: Outflow portion; 213: Convex portion; 214: Engaging portion; 215: Knob portion; 221: Pushing portion; 222: Opening portion; 223: Guiding portion; 223*a*: First regulating portion; 223*b*: Second regulating portion; 224: Groove portion; 421: Liquidtight portion; 421*a*: Convex portion; 421*b*: Convex portion; 422: Liquidtight portion; 422*a*: Convex portion; 422*b*: Convex portion; 423: Flexion.

DETAILED DESCRIPTION OF THE PREFERRED EMBODIMENT

As explained above, the present invention can be accomplished in various ways including, but not limited to, the foregoing embodiments. The present invention will be explained in detail with reference to the drawings, but the present invention should not be limited thereto.

Figure 1:
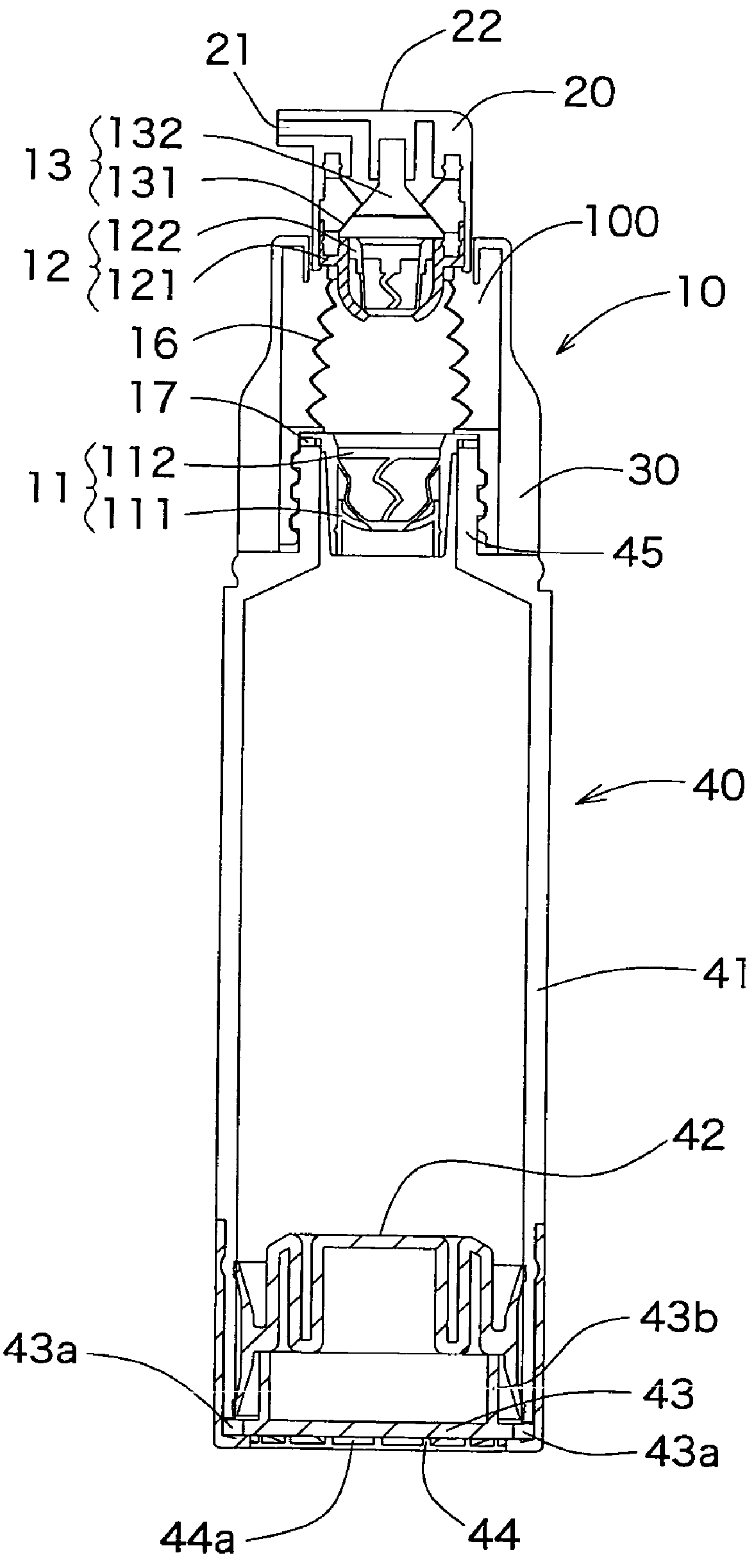
FIG. 1 is a longitudinal view of a fluid container to which a fluid discharge pump 10 according to Embodiment 1 of the present invention applies.
Figure 2:
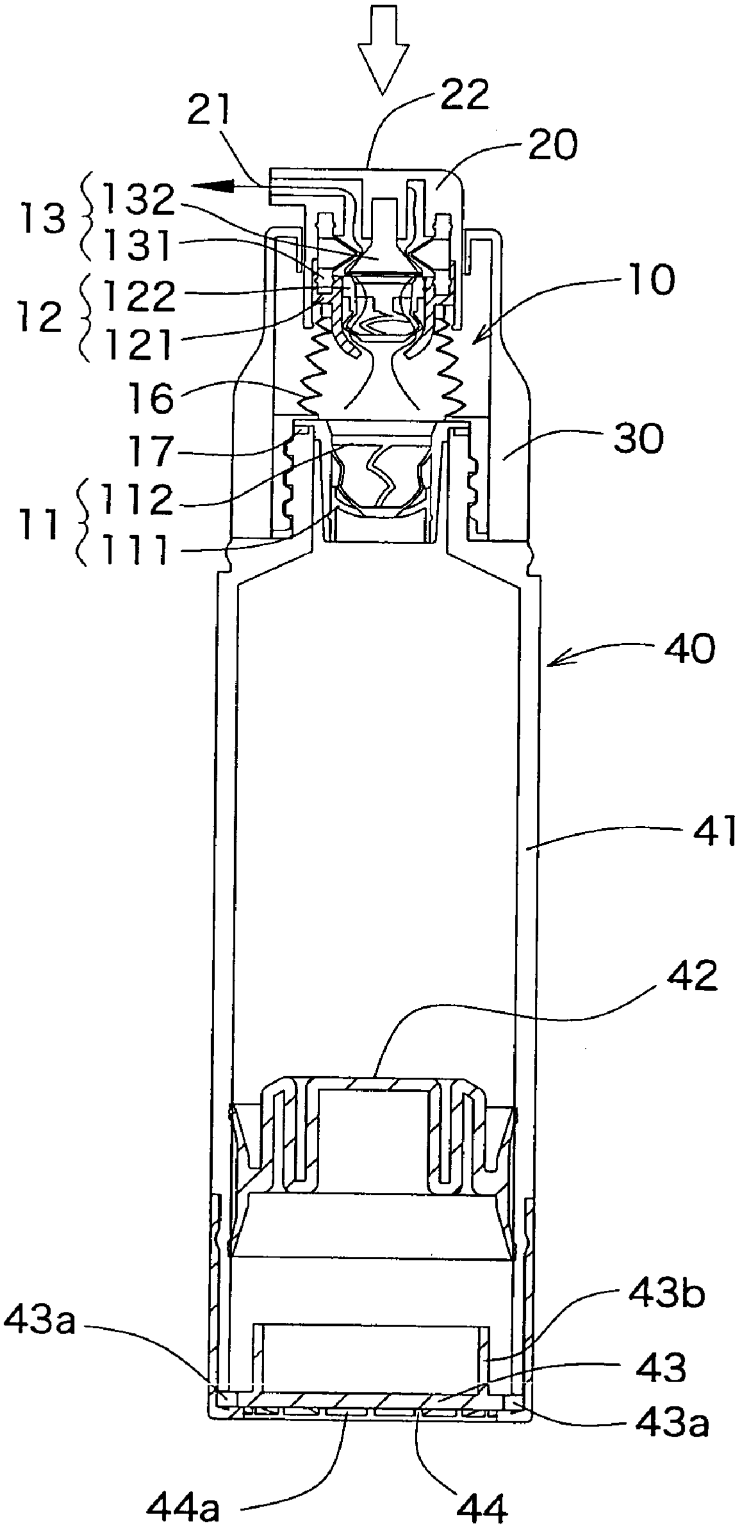
FIG. 2 is a longitudinal view of the fluid container to which the fluid discharge pump 10 according to Embodiment 1 of the present invention applies, wherein the nozzle head is pressed.
Figure 3:
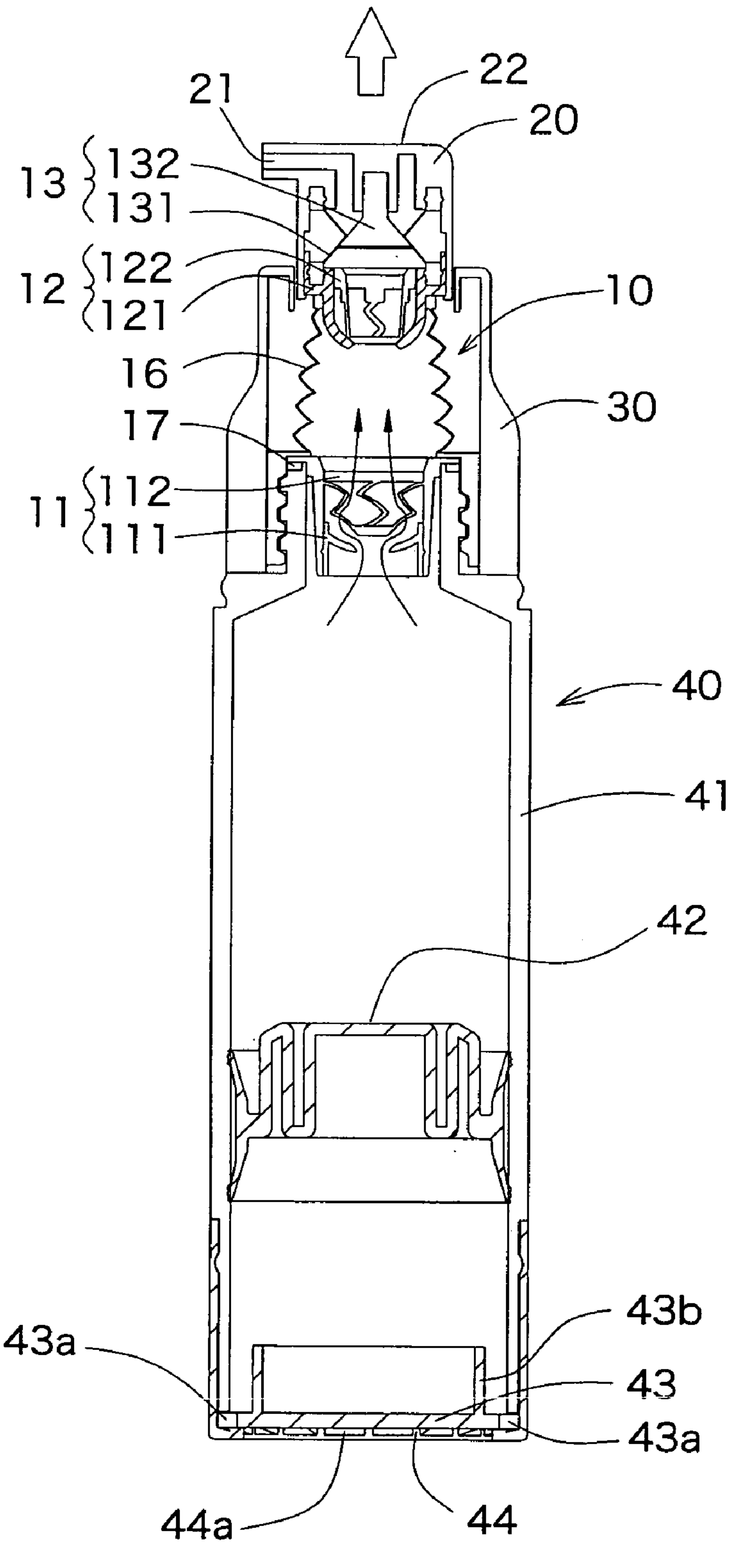
FIG. 3 is a longitudinal view of the fluid container to which the fluid discharge pump 10 according to Embodiment 1 of the present invention applies, wherein the nozzle head is released.

Preferred embodiments of the present invention are described by reference to drawings. FIGS. 1 to 3 are longitudinal cross-sections showing a fluid container to which a fluid discharge pump 10 according to Embodiment 1 of the present invention applies. FIG. 1 shows a position in which a nozzle head 20 is left with no stress applied; FIG. 2 shows a position in which the nozzle head 20 is pressed; FIG. 3 shows a position in which a pressure applied to the nozzle head 20 is removed.

This fluid container can be used as a container for beauty products for storing gels such as hair gels and cleansing gels, creams such as nourishing creams and cold creams or liquids such as skin lotions used in the cosmetic field. Additionally, this fluid container also can be used as a container for medicines, solvents or foods, etc. In this specification, high-viscosity liquids, semifluids, gels that sol solidifies to a jelly, and creams and regular liquids are all referred to as fluids.

This fluid container comprises the fluid discharge pump 10 according to the above embodiment, the nozzle head 20, and a fluid-storing portion storing a fluid inside it.

Additionally, in this specification, upward and downward directions in FIGS. 1 and 2 are defined as upward and downward directions in the fluid container. In other words, in the fluid container according to the present invention, the side of the nozzle head 20 shown in FIG. 1 is defined as the upward direction; the side of a piston member 42 is defined as the downward direction.

The nozzle head 20 has a discharge portion 21 for discharging the fluid, a pushing portion 22 to be pressed when the fluid is discharged, a sliding area 23 slidably engaged with an outflow valve seat member 121, a joined portion 24, and a fixed portion 25.

The outflow valve seat member 121 here comprises an outflow valve mechanism 12 described in detail later. Additionally, the joined portion 24 is to be joined with a tubular member 131 in a leakage prevention mechanism 13 described in detail later; the fixed portion 25 is used for fixing a contacting member 132 in the leakage prevention mechanism 13.

Additionally, at the upper limit of the sliding area 23, an upper-limit stopper 23*a* for restricting an upper limit of a travel distance of the outflow valve mechanism 12 relatively to the nozzle head 20 is formed; at the lower limit of the sliding area 23, a lower-limit stopper 23*b* for restricting a lower limit of a travel distance of the outflow valve mechanism 12 relatively to the nozzle head 20 is formed. By these stoppers, as described in detail later, an adequate pressure can be applied to a bellows member 16; additionally, if momentum given by the tubular member 131 is large, relative movement of the nozzle head 20 and the outflow valve mechanism 12 can be stopped at an adequate position.

Additionally, an outer lid 30 may be engaged with a screw portion formed at the upper end of the fluid-storing portion 40 by a screw member.

The fluid-storing portion 40 may have a tubular cylinder member 41, the piston member 42 traveling up and down inside the cylinder member 41, an inner lid 43 in which multiple air vents 43*a* are formed, and an outer lid 44. The cylinder member 41 in the fluid-storing portion 40 and the fluid discharge pump 10 are liquidtightly connected via packing. Additionally, if the inflow valve mechanism 11 connected to the cylinder member of the fluid discharge pump 10 is adequately elastic, the packing 17 can be omitted.

The outer lid 44 may be attached to the lower portion of the cylinder member 41 in a position sandwiching the inner lid 43 between the outer lid 44 and the lower portion of the cylinder member 41. In the inner lid 43, the upper side of the bottom 43*b* may be formed for positioning the tail end of the piston member 42 inside the fluid-storing container. By changing a height of this upper side of the bottom 43*b*, a storable fluid amount inside the fluid-storing container can be changed.

Additionally, a hole 44*a* may be formed in the central portion of the outer lid 44. Because of this hole, the air can pass through between outside of the fluid container and the air vents 43*a* formed in the inner lid 43.

As shown in FIGS. 1 to 3, in this fluid container, by reciprocating the piston member 42 up and down by pressing the pushing portion 22 in the nozzle head 20, a fluid stored inside the fluid-storing portion 40 can be discharged from the discharge portion 21 in the nozzle head 20 by the action of the fluid discharge pump 10 described in detail later. As a fluid amount inside the fluid-storing portion 40 decreases, the piston member 42 travels in a direction of the nozzle head 20 inside the cylinder member 41.

A configuration of the fluid discharge pump 10 according to Embodiment 1 of the present invention is described below. However, the present invention is not limited thereto.

The fluid discharge pump 10 may comprise a resinous bellows member 16 having an inflow opening 16*a* and an outflow opening 16*b* (See FIG. 9.), a resinous inflow valve mechanism 11 fixed in the inflow opening 16*a* of the bellows member 16, a resinous outflow valve mechanism 12 fixed in the outflow opening 16*b* of the bellows member 16, and a leakage prevention mechanism 13 which opens only when the nozzle head 20 is pressed.

In this embodiment, this inflow valve mechanism 11 is for letting a fluid stored inside the fluid-storing portion 40 as the bellows member 16 stretches; the outflow valve mechanism 12 is for letting the fluid having flowed into the fluid discharge pump 10 flow out into the nozzle head 20 as the bellows member 16 folds up. The leakage prevention mechanism 13 is for opening up between the fluid discharge pump 10 and the nozzle head 20 only when the pushing portion 22 in the nozzle head 20 is pressed.

Figure 4A:
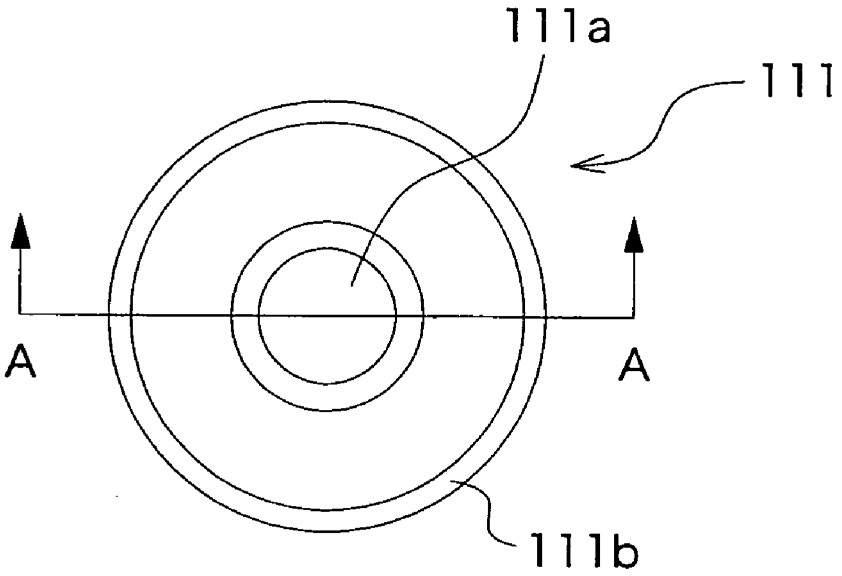
FIGS. 4(*a*), 4(*b*), and 4(*c*) are a top view, a cross sectional view of line A—A, and a bottom view, respectively, showing the outflow valve seat member 111 comprising the outflow valve mechanism 11 in the fluid discharge pump 10 according to an embodiment of the present invention.
Figure 4B:
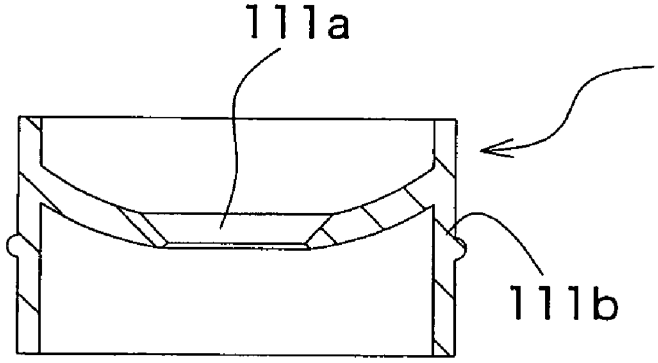
Figure 4C:
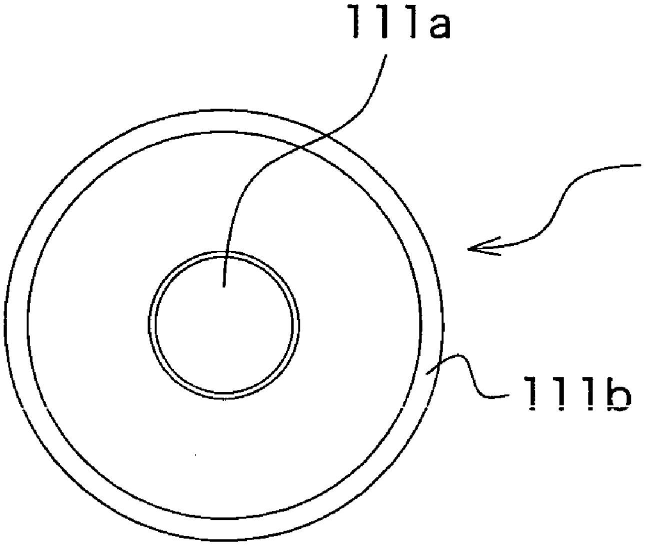
Figure 5A:
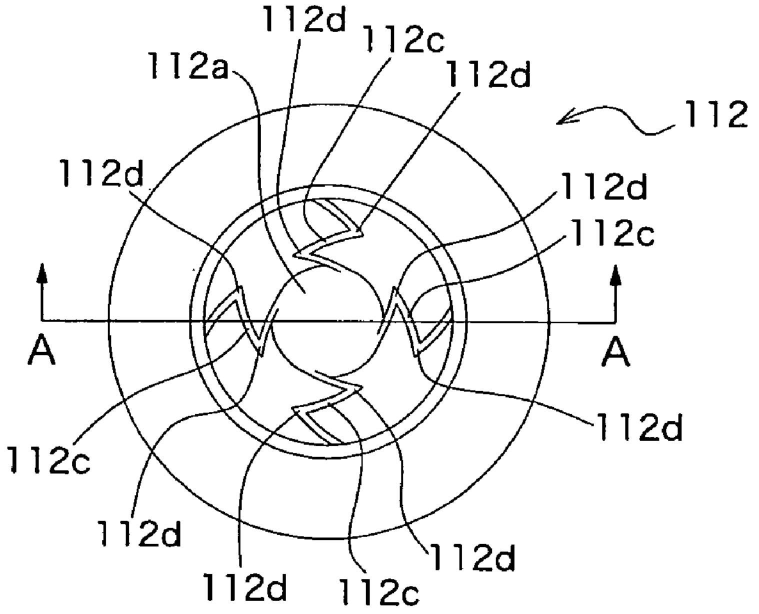
FIGS. 5(*a*), 5(*b*), 5(*c*) are a top view, a cross sectional view of line A—A, and a bottom view, respectively, showing the inflow valve member 112 comprising the inflow valve mechanism 11 in the fluid discharge pump 10 according to an embodiment of the present invention.
Figure 5B:
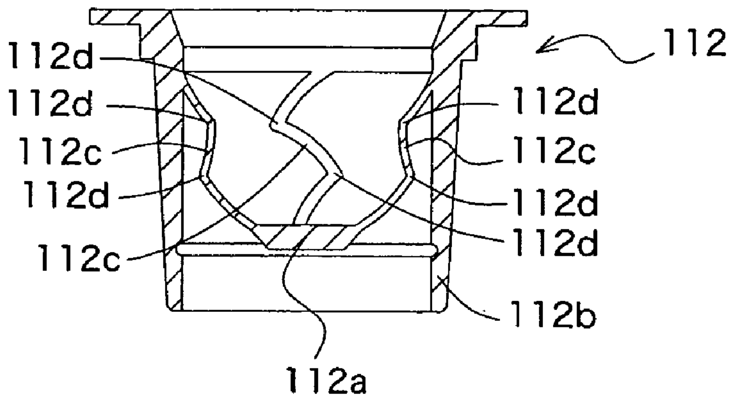
Figure 5C:
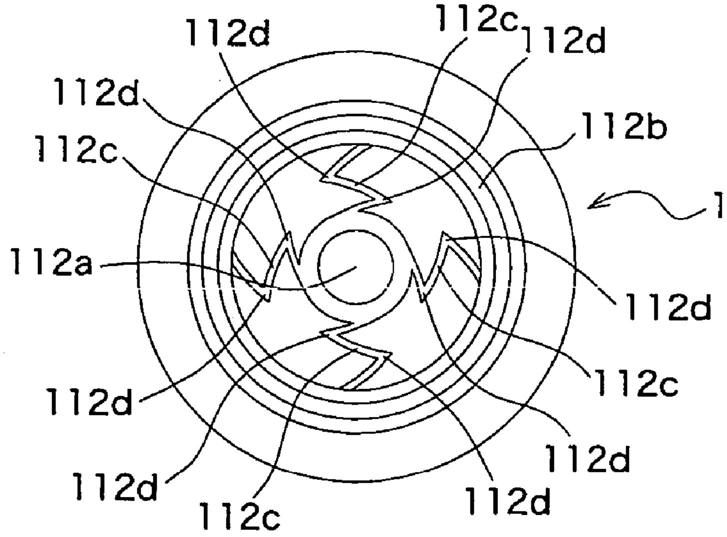

FIG. 4(*a*) is a plane view of an outflow valve seat member 111 in an embodiment comprising the outflow valve mechanism 11 in the fluid discharge pump 10; FIG. 4(*b*) is an A—A section in FIG. 4(*a*); FIG. 4(*c*) is a backside view of FIG. 4(*a*). FIG. 5(*a*) is a plane view of the inflow valve seat member 112 in an embodiment comprising the inflow valve mechanism 11 in the fluid discharge pump 10; FIG. 5(*b*) is an A—A section in FIG. 5(*a*); FIG. 5(*c*) is a backside view of FIG. 5(*a*).

As shown in FIGS. 4(*a*)–(*c*), the inflow valve seat member 111 may comprise an opening portion 111*a* for letting a fluid inside the fluid-storing portion 40 flow in, and a joined portion 111*b* joined with the inflow valve member 112 described later.

As shown in FIGS. 5(*a*)–(*c*), the inflow valve member 112 may comprise a valve body 112*a* having a shape corresponding to a shape of the opening portion 111*a* of the inflow valve seat member 111, a supporting portion 112*b* for fixing the joined portion 111*b* of the inflow valve seat member 111, and four coupling portions 112*c* for coupling the valve body 112*a* and the supporting portion 112*b*. The respective four coupling portions 112*c* may have one pair of flexions 112*d*, hence adequate flexibility is provided. The number of the coupling portions need not be four but can be two, three, five, six, etc. The coupling portions 112*c*, the supporting portion 112*b*, and the valve body 112*a* can be integrated and formed as a one piece.

Figure 6A:
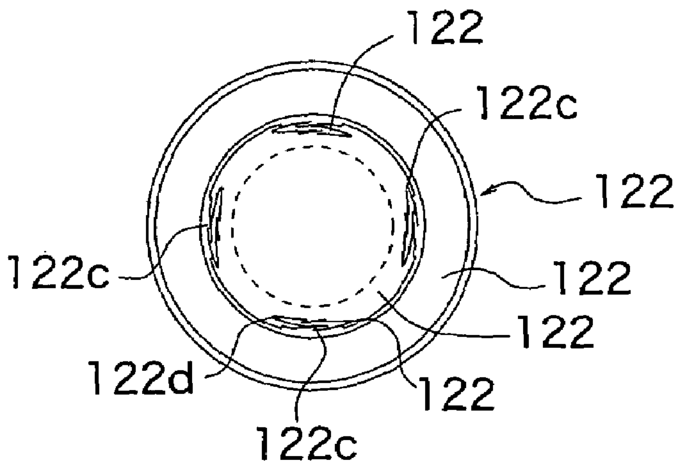
FIGS. 6(*a*) and 6(*b*) are a top view and an explanatory side view, repectively, showing the outflow valve member 122 and the outflow valve seat member 121 comprising the outflow valve mechanism 12 in the fluid discharge pump 10 according to an embodiment of the present invention.
Figure 6B:
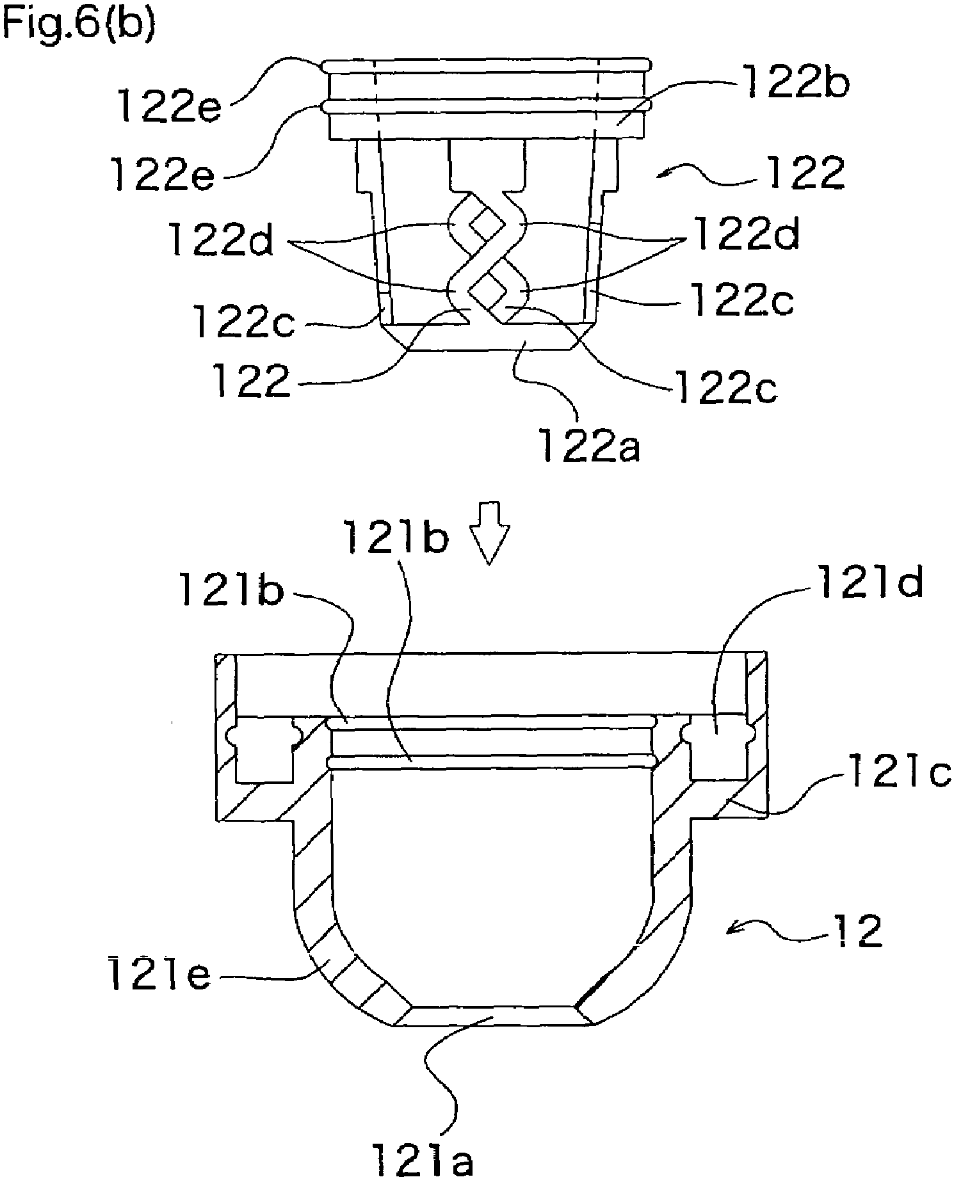

FIGS. 6(*a*)–(*b*) are explanatory views of an outflow valve member 122 and an outflow valve seat member 121 in an embodiment comprising the outflow valve mechanism 12 in the fluid discharge pump 10. FIG. 6(*a*) shows a plane view of the outflow valve member 122; FIG. 6(*b*) shows a position in which the outflow valve member 122 and the outflow valve seat member 121 are assembled. In FIG. 6(*b*), the side of the outflow valve member 122 and a cross section of the outflow valve seat member 121 respectively are shown.

As shown in FIGS. 6(*a*)–(*b*), the outflow valve seat member 121 comprises a circular opening portion 121*a* functioning as a valve seat at its bottom; a pair of convex portions formed on its upper inner surface; a convex guiding portion 121*c*, which guides movement of the nozzle head 20, on its upper outer surface. Further, a joined portion 121*d* joined with the tubular member 131 comprising the leakage prevention mechanism 13 described in detail later is formed at the upper side of the outflow valve mechanism 121.

The outflow valve member 122 may have a valve body 122*a* having a shape corresponding to a circular opening portion 121*a* in the outflow valve seat member 121, an annular supporting portion 122*b* disposed inside the outflow valve seat member 121, and four coupling portions 122*c* coupling the supporting portion 122*b* and the valve body 122*a*. Each of four coupling portions 122*c* may have a pair of flexions 122*d*. In this outflow valve member 122, by the flexibility of four coupling portions 122*c*, it is configured that the valve body 122*a* is able to travel between a closed position in which the opening portion 121*a* in the outflow valve seat member 121 is closed and an open position in which the opening portion 121*a* is open. The number of the coupling portions need not be four but can be two, three, fix, six, etc. The coupling portions 122*c*, the valve body 122*a*, and the supporting portion 122*b* can be integrated and formed as a one piece.

On the outer peripheral surface of the supporting portion 122*b* in the outflow valve member 122, a pair of convex portions 122*e* may be formed. Consequently, when this outflow valve member 122 is inserted into the outflow valve seat member 121, a pair of concave portions 121*b* in the outflow valve seat member 121 and a pair of concave portions 122*e* in the outflow valve member 122 are engaged with each other by press fitting, locking the outflow valve member 122 inside the outflow valve seat member 121.

Figure 7A:
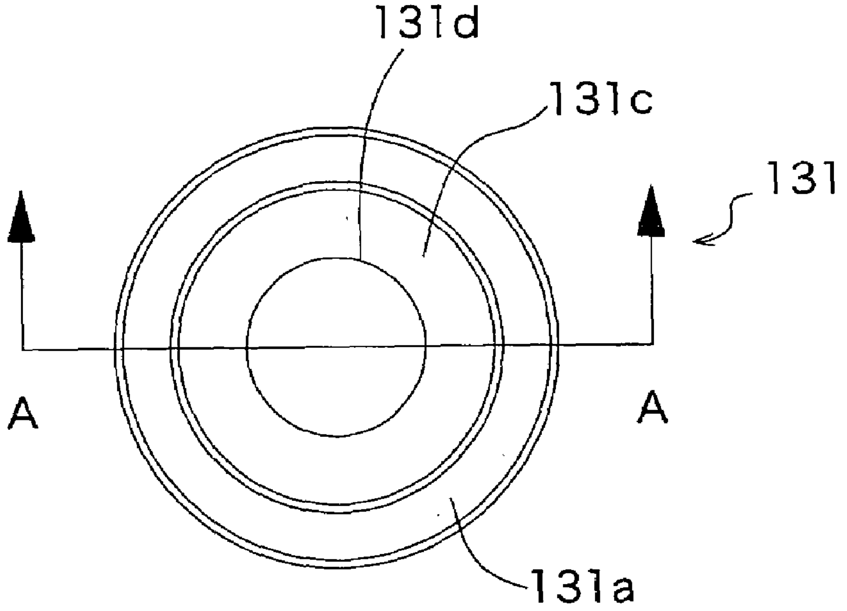
FIGS. 7(*a*), 7(*b*), and 7(*c*) are a top view, a cross sectional view of line A—A, and a side view, respectively, showing the tubular member 131 comprising the leakage prevention mechanism 13 applying to the fluid container according to an embodiment of the present invention.
Figure 7B:
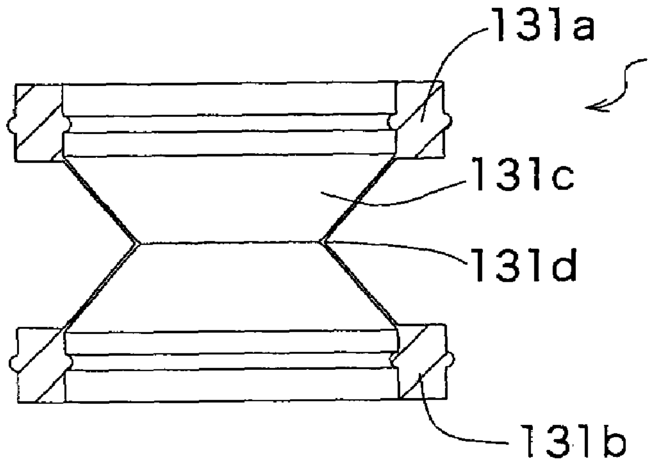
Figure 7C:
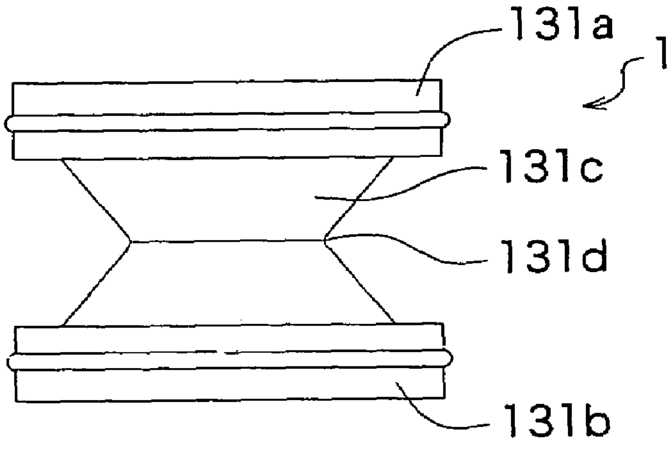
Figure 8A:
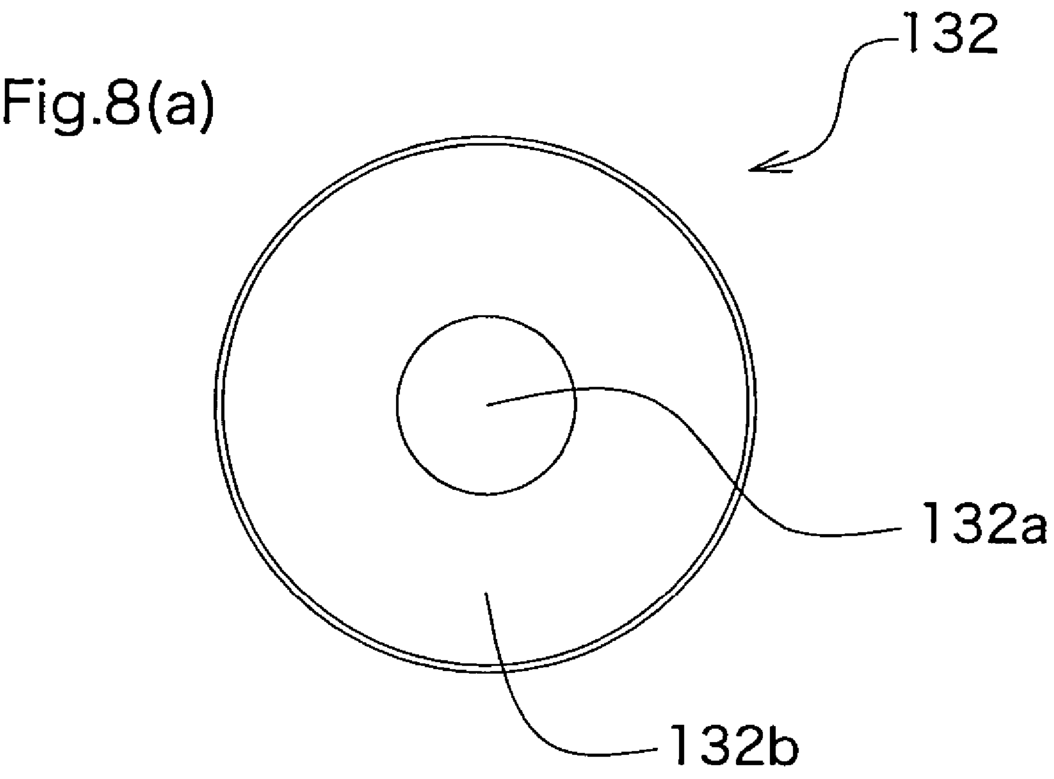
FIGS. 8(*a*) and 8(*b*) are a top view and a side view, respectively, showing the contacting member 132 comprising the leakage prevention mechanism 13 applying to the fluid container according to an embodiment of the present invention.
Figure 8B:
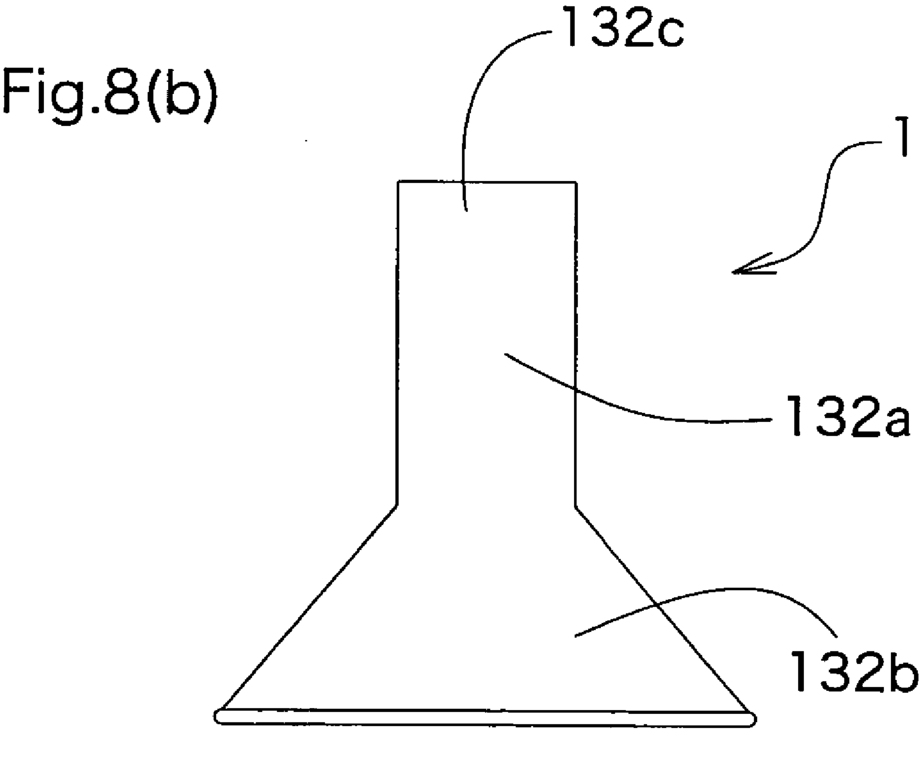

FIG. 7(*a*) is a plane view of the tubular member 131 in an embodiment comprising the leakage prevention mechanism 13 applying to the fluid container according to Embodiment 1 of the present invention; FIG. 7(*b*) is a lateral view of the same; FIG. 7(*c*) is a sectional lateral view of the same. FIG. 8(*a*) is a plane view of the contacting member 132 in an embodiment comprising the leakage prevention mechanism 13 applying to the fluid container according to Embodiment 1 of the present invention; FIG. 8(*b*) is a lateral view of the same.

As shown in FIGS. 7(*a*)–(*c*), the tubular member 131 has a first supporting portion 131*a* joined with the joined portion 24 of the nozzle head 20, a second supporting portion 131*b* of the outflow valve seat member 121 comprising the outflow valve mechanism 12, and a tubular coupling portion 131*c* in which a flexion 131*d* is formed. This coupling portion 131*c* gives momentum to the first supporting portion 131*a* and the second supporting portion 131*b* in a direction of the supporting portions separating from each other. The tubular member 131 can be formed as a one piece.

As shown in FIGS. 8(*a*)–(*b*), the contacting member 132 may have a joined portion 132*a* fixed in the fixed portion 25 of the nozzle head 20, and a lid portion 132*b* formed at the lower end of the joined portion 132*a*.

These tubular member 131 and contacting member 132 may be assembled in such a way that the joined portion 132*a* of the contacting member 132 is inserted into the flexion 131*d* of the tubular member 131; in a position in which the members is left with no stress applied, the lid portion 132*b* contacts a surface of the flexion 131*d* in the coupling portion 131*c* of the tubular member 131.

This lid portion 132*b* may have a shape corresponding to a shape of the coupling portion 131*c* of the tubular member 131, which is left with no stress applied. Consequently, it is possible to secure adequate liquidtightness for preventing fluid leakage.

Figure 9:
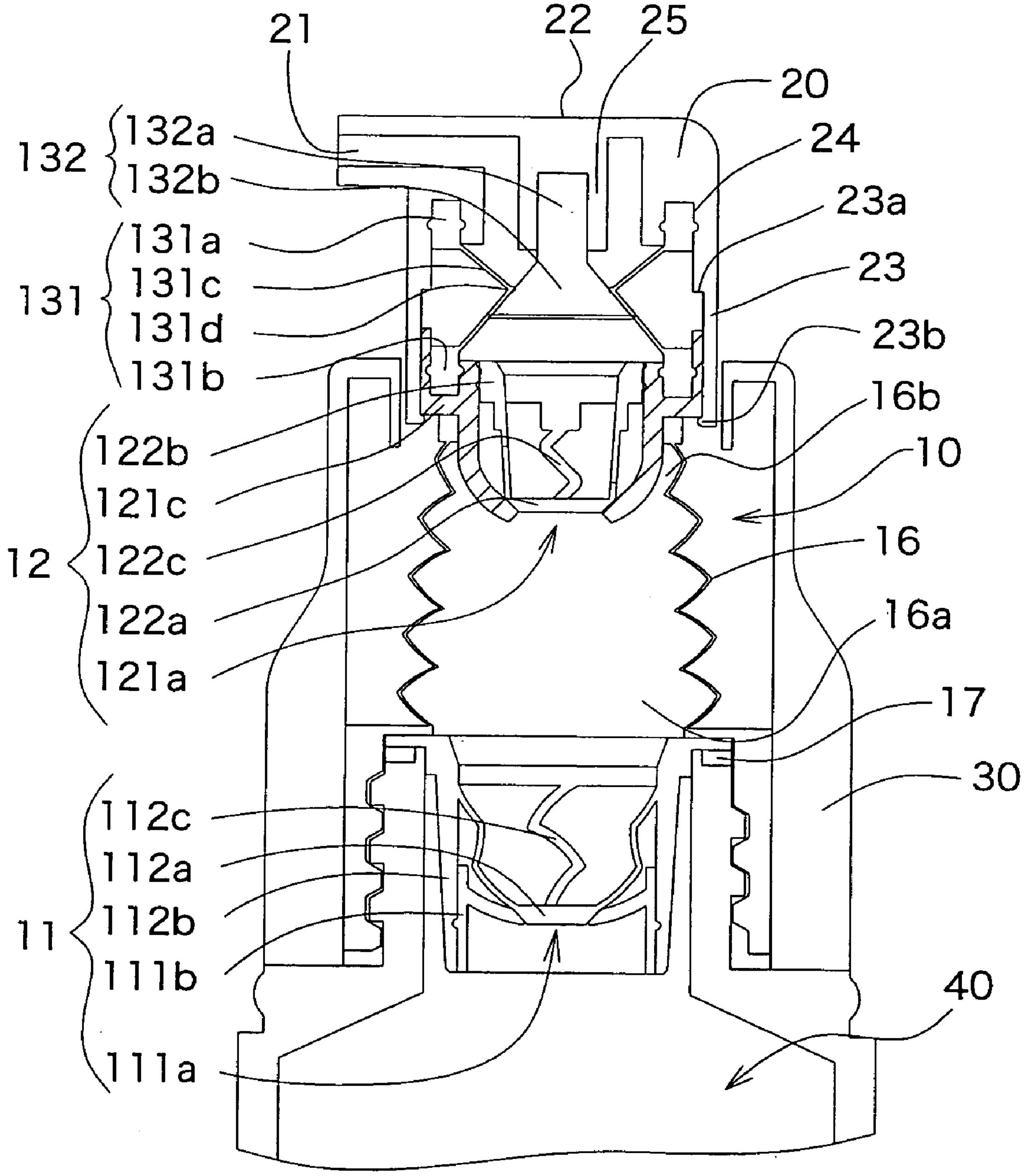
FIG. 9 is an enlarged longitudinal view showing the fluid discharge pump 10 according to Embodiment 1 of the present invention along with the nozzle head 20.
Figure 10:
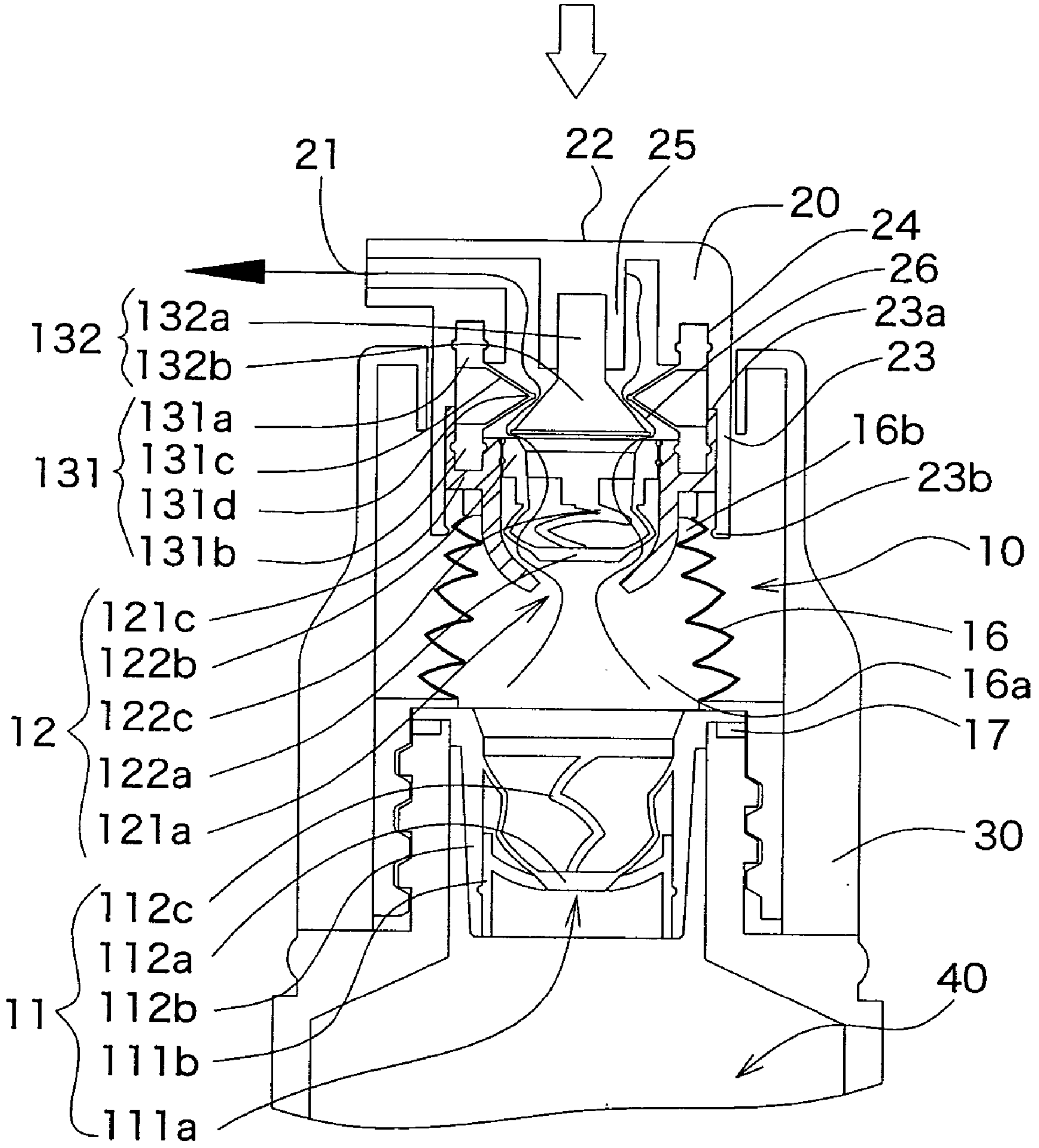
FIG. 10 is an enlarged longitudinal view showing the fluid discharge pump 10 according to Embodiment 1 of the present invention along with the nozzle head 20, wherein the nozzle head is pressed.
Figure 11:
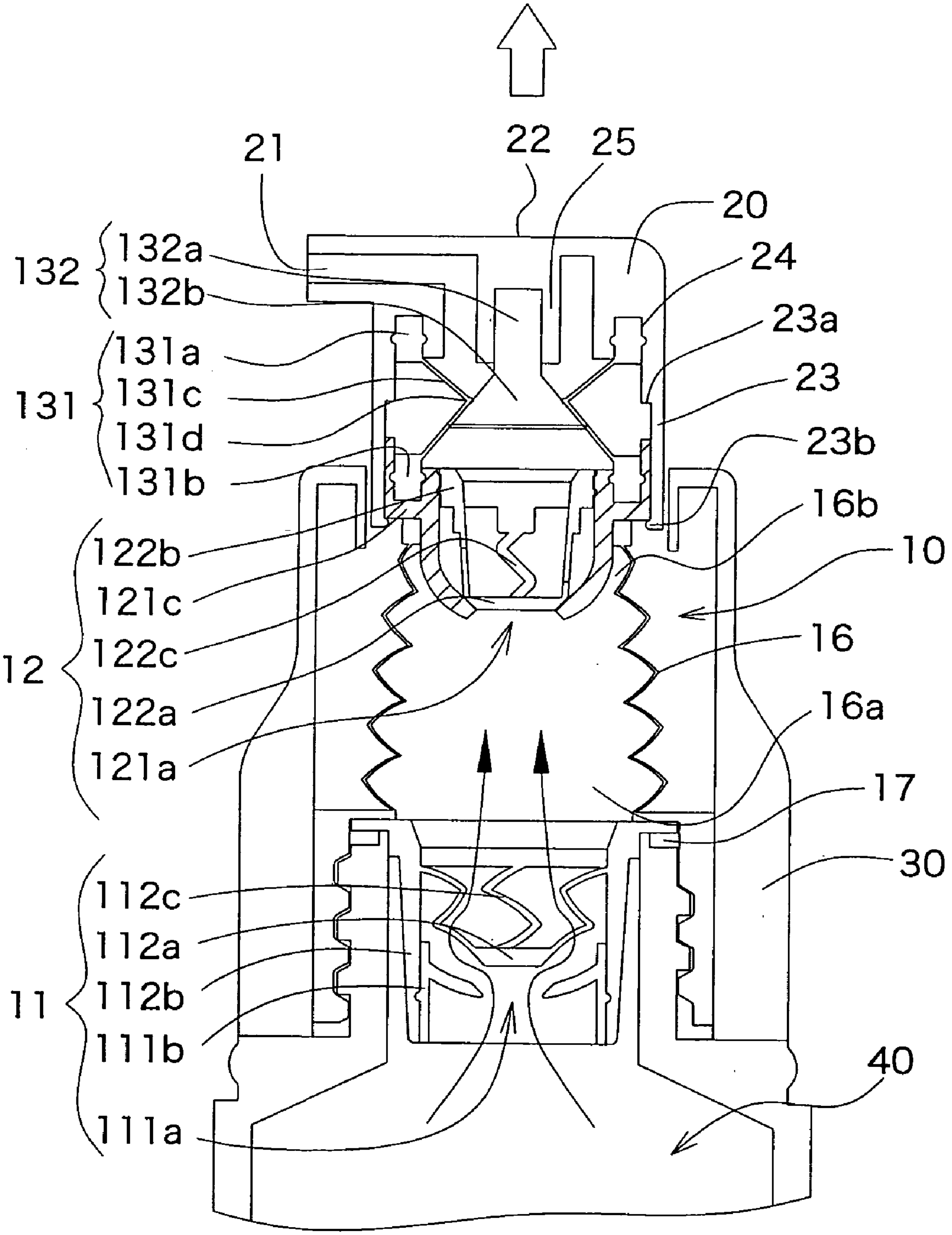
FIG. 11 is an enlarged longitudinal view showing the fluid discharge pump 10 according to Embodiment 1 of the present invention along with the nozzle head 20, wherein the nozzle head is released.

FIGS. 9 to 11 are longitudinal cross-sections showing the fluid discharge pump 10 according to Embodiment 1 of the present invention. FIG. 9 shows a position in which the nozzle head 20 is left with no stress applied; FIG. 10 shows a position in which, with the pushing portion 22 in the nozzle head 20 pressed, the bellows member 16 is deforming to a folded-up position in which it holds a relatively small amount of fluid from a stretched position in which it holds a relatively large amount of fluid inside it; FIG. 11 shows a position in which, with a pressure applied to the pushing portion 22 in the nozzle head 20 removed, the bellows member 16 is deforming from the folded-up position to the stretched position again.

As shown in FIG. 10, when the pushing portion 22 in the nozzle head 20 is pressed, the nozzle head 20 moves downward relatively to the outflow valve mechanism 11 comprising the fluid discharge pump 10 against momentum given by the tubular member 131. By this, the flexion 131*d* in the coupling portion 131*c* of the tubular member 131 and the lid portion 132*b* in the contacting member 132 comprising the leakage prevention mechanism 14 separate from each other and a fluid flow path is formed.

If the nozzle head 20 continues to move further, the guiding portion 121*c* of the outflow valve seat member 121 comprising the outflow valve mechanism 12 contacts the upper-limit stopper 23*a* in the nozzle head 20; after the contact, the nozzle head 20 and the outflow valve mechanism 12 move downward integrally.

Consequently, the bellows member 16 is pushed, a capacity of the bellows member 16 decreases, and inside the fluid discharge pump is pressurized. By this, the valve body 112*a* of the inflow valve member 112 is disposed in a position in which the valve body contacts the opening portion 111*a* of the inflow valve seat member 111, and the opening portion 111*a* is closed; simultaneously, the valve body 122*a* of the outflow valve member 122 is disposed in a position in which the valve body separates from the opening portion 121*a* of the outflow valve seat member 121, and the opening portion 121*a* is open. Consequently, a fluid inside the fluid discharge pump 10 flows out to the discharge portion 21 of the nozzle head 20.

As shown in FIG. 11, when a pressure applied to the pushing portion 22 in the nozzle head is removed, the nozzle head 20 moves upward relatively to the outflow valve mechanism 12 comprising the fluid discharge pump 10 by momentum given by the tubular member 131; the guiding portion 121*c* of the outflow valve seat member 121 comprising the outflow valve mechanism 12 contacts the lower-limit traveling stopper 23*b* in the nozzle head 20. By this, the lid portion 132*b* in the contacting member 132 comprising the leakage prevention mechanism 13 contacts a surface of the flexion 131*d* in the coupling portion 131*c* of the tubular member 131 again, and outflow of the fluid can be completely blocked.

After the contact, the nozzle head 20 and the outflow valve mechanism 12 can move upward integrally by the resilience of the bellows member 16. Consequently, a capacity of the bellows member 16 expands and inside the fluid discharge pump is depressurized. By this, the valve body 112*a* of the inflow valve member 112 is disposed in a position in which the valve body separates from the opening portion 111*a* of the inflow valve seat member 111; simultaneously, the valve body 122*a* of the outflow valve member 122 is disposed in a position in which the valve body contacts the opening portion 121*a* of the outflow valve seat member 121. Consequently, the fluid stored inside the fluid-storing portion 40 can flow into the fluid discharge pump 10.

Figure 12A:
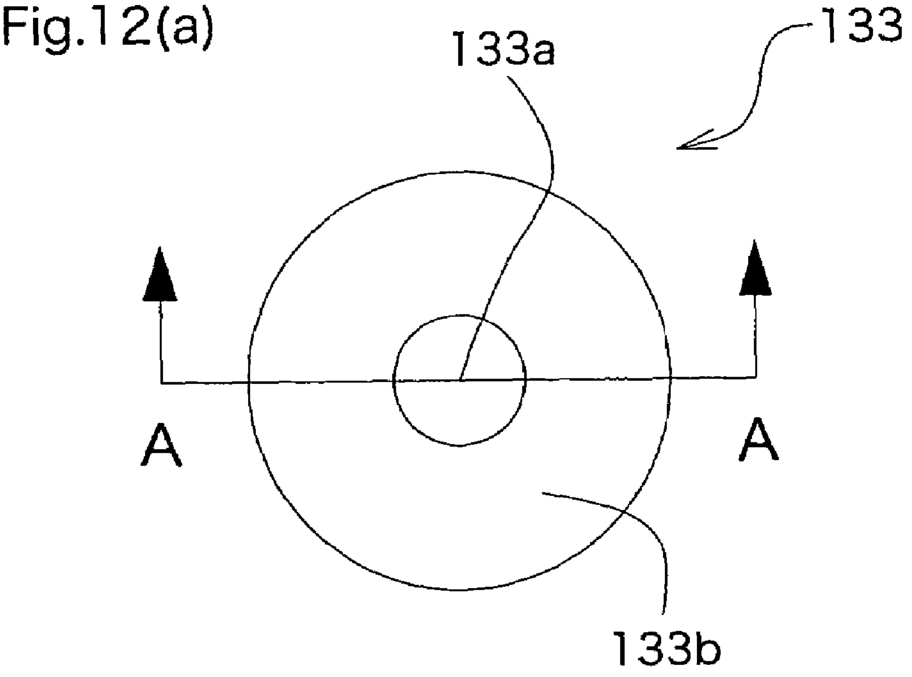
FIGS. 12(*a*) and 12(*b*) are a top view and a cross sectional view of line A—A, respectively, showing the contacting member 133 in the leakage prevention mechanism 13 according to Embodiment 2 of the present invention.
Figure 12B:
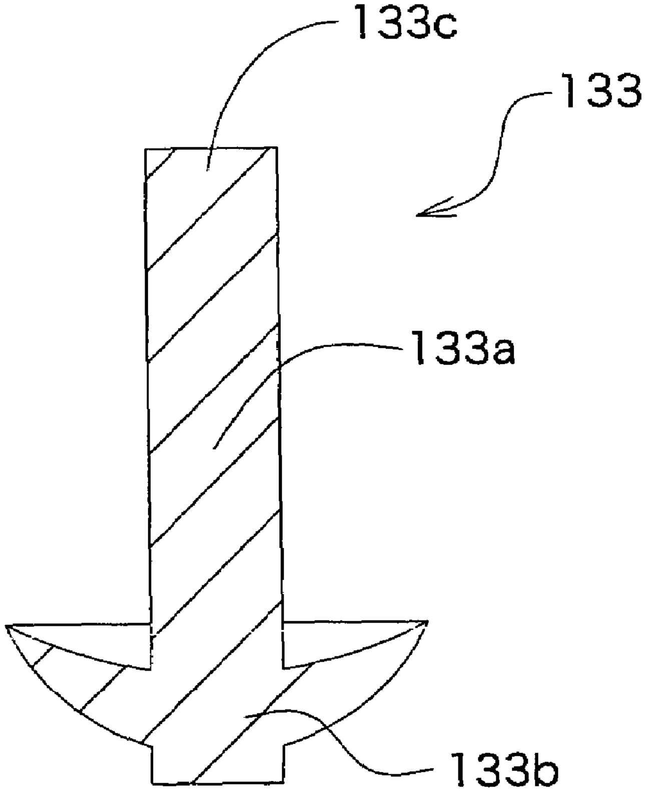

Embodiment 2 of the present invention is described by reference to drawings. FIG. 12(*a*) is a plane view of a contacting member 133 in the leakage prevention mechanism 13 according to Embodiment 2 of the present invention. FIG. 12(*b*) is a cross-sectional view showing an A—A section in FIG. 12(*a*).

Figure 13:
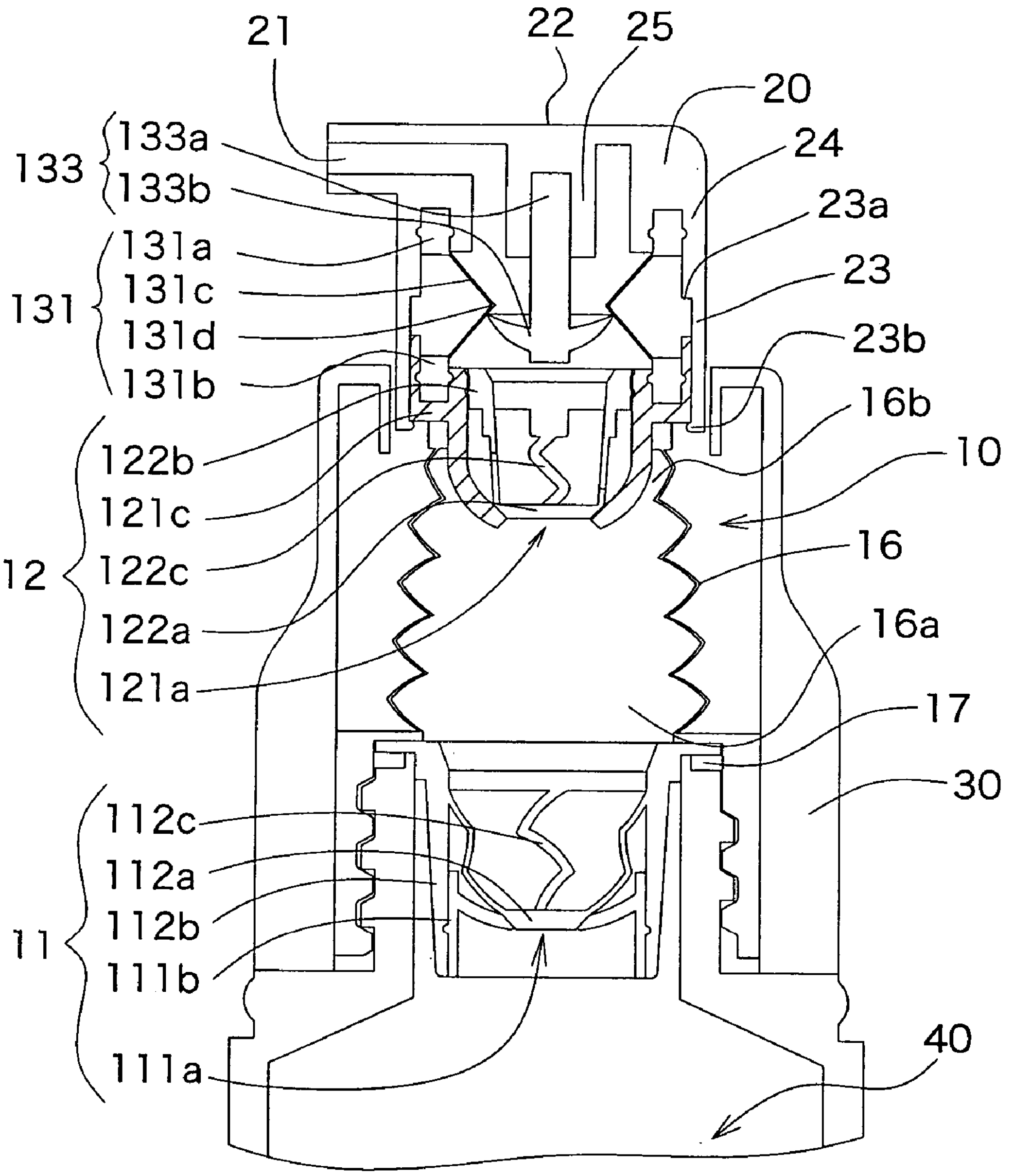
FIG. 13 is an enlarged longitudinal view showing the fluid discharge pump 10 according to Embodiment 2 of the present invention along with the nozzle head 20.
Figure 14:
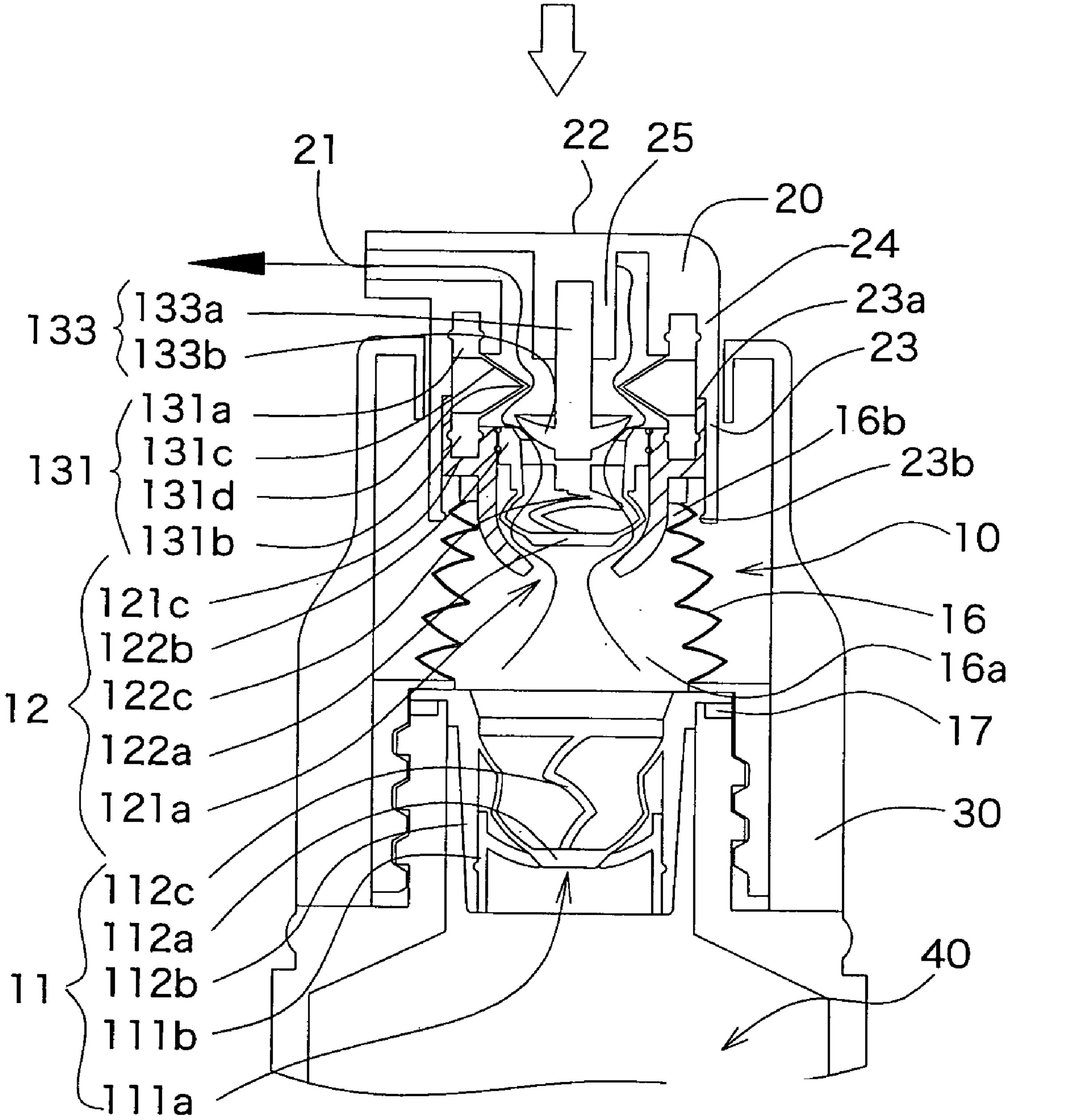
FIG. 14 is an enlarged longitudinal view showing the fluid discharge pump 10 according to Embodiment 2 of the present invention along with the nozzle head 20, wherein the nozzle head is pressed.
Figure 15:
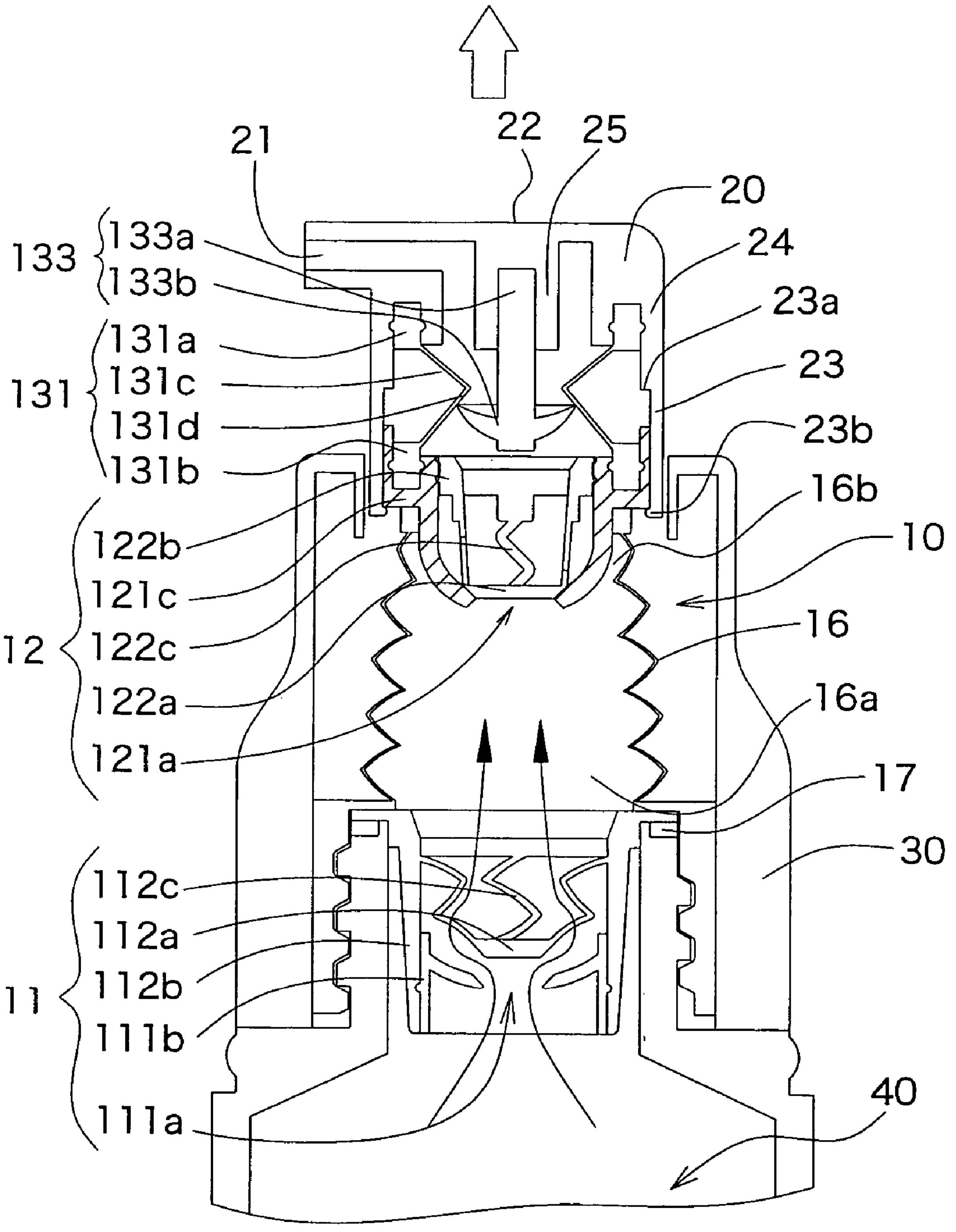
FIG. 15 is an enlarged longitudinal view showing the fluid discharge pump 10 according to Embodiment 2 of the present invention along with the nozzle head 20, wherein the nozzle head is released.

FIGS. 13 to 15 are longitudinal cross sections showing the fluid discharge pump 10 according to Embodiment 2 of the present invention along with the nozzle head 20. Of these, FIG. 13 shows a position in which the nozzle head 20 is left with no stress applied; FIG. 14 shows a position in which, with the pushing portion 22 in the nozzle head 20 pressed, the bellows member 16 is deforming to a folded-up position in which it holds a relatively small amount of fluid from a stretched position in which it holds a relatively large amount of fluid inside it; FIG. 15 shows a position in which, with a pressure applied to the pushing portion 22 in the nozzle head 20 removed, the bellows member 16 is deforming from the folded-up position to the stretched position again. Additionally, for FIGS. 13 to 15, when the same members as used in Embodiment 1 are used in this embodiment, the same symbols are used and detailed descriptions of the members are omitted.

As shown in FIGS. 12(*a*) and (*b*), the contacting member 133 has a joined portion 133*a* fixed in a fixed portion 25 of the nozzle head 20, and a lid portion 133*b* formed at the lower end of the joined portion 133*a*.

While in the fluid container according to Embodiment 1 of the present invention, the leakage prevention mechanism 13 comprises the tubular member 131 and the contacting member 132, the fluid container according to Embodiment 2 of the present invention differs in the leakage prevention mechanism 13 comprising the tubular member 131 and the contacting member 133. In other words, while the lid portion 132*b* in the contacting member 132 has a shape corresponding to a shape in a natural position of the coupling portion 141 of the tubular member 131, the lid portion 133*b* in the contacting member 133 has a shape contacting a partial inner circumference of the coupling portion 131*c* of the tubular member 131.

Consequently, as shown in FIG. 14, when a fluid flow path is formed in the leakage prevention mechanism 13, the flow path can be temporarily formed to enable the fluid to flow out smoothly.

The contacting member 132 or 133 can be in a different shape such as a sphere with a lod.

Additionally, the upper-limit stopper 23*a* and the lower-limit stopper 23*b* described earlier are for restricting a relative travel distance of the nozzle head 20 and the outflow valve mechanism and are formed in a sliding area 23 of the nozzle head 20. It is possible, however, for these stoppers to have other shapes as long as the stoppers restricting the relative travel distance of the nozzle head 20 and the outflow mechanism 12; it is possible to form the stoppers in other members as well. These upper-limit stopper 23*a* and lower-limit stopper 23*b* function as a means for restricting a relative travel distance of the nozzle head 20 and the outflow valve mechanism 12.

As described above, according to an embodiment of the present invention, when the fluid discharge pump comprises a resinous outflow valve mechanism capable of moving relatively to the nozzle head, a tubular member having a first supporting portion coupled with the nozzle head, a second supporting portion coupled with the outflow valve mechanism and a tubular coupling portion in which a flexion is formed and which couples the first supporting portion and the second supporting portion in a position in which momentum is given in a direction of the supporting portions separating from each other, and a contacting portion having a joined portion one end of which is coupled with the nozzle head and which is inserted into the flexion of the tubular member and a lid portion formed at the other end of the joined portion and contacting a surface of the flexion in the coupling portion of the tubular member, and with the nozzle head descending against the outflow valve mechanism, the flexion in the tubular member and the lid portion in the contacting member separate from each other and a flow path for a fluid is formed, it becomes possible to completely prevent leaking out of a fluid from the container.

According to another embodiment of the present invention, when the inflow valve mechanism comprises a valve seat member in which an opening portion for letting the fluid flow in is formed and a valve member having an annular supporting portion and a valve portion connected to the supporting portion via multiple coupling portions and the outflow valve mechanism comprises a valve seat member in which an opening for letting the fluid flow out is formed and a valve member having an annular supporting portion and a valve portion connected to the supporting portion via multiple coupling portions, it becomes possible to completely prevent leaking out of a fluid from the container while a configuration is simple.

According to still another embodiment of the present invention, when the nozzle head possesses stoppers restricting a relative travel distance of the outflow valve mechanism, it is possible to apply a proper pressure to the bellows member. Additionally, even when the momentum given by the tubular member is large, it is possible to stop relative movement of the nozzle head and the outflow valve mechanism in a proper position.

In the above, the leakage prevention mechanism is constituted by the contacting member and the tubular member (which serves a third valve mechanism). However, the present invention is not limited thereto. Leakage prevention can be accomplished by alternative valve mechanisms as explained below.

The invention according to Embodiment 3 is a fluid container comprising a fluid discharge pump for letting a fluid stored inside a fluid-storing portion flow out from a nozzle head disposed on the upper side of said fluid-storing portion by pressing the nozzle head. The fluid container is characterized in that the nozzle head possesses a tubular member having an inflow portion for letting the fluid flow in from the fluid discharge pump and an outflow portion for letting the fluid having flowed in from the inflow portion flow out, which is switchable between an open position enabling the fluid to pass through between the inflow portion and the fluid discharge pump and a closed position shutting off the fluid passing through between the inflow portion and the fluid discharge pump, and a guiding member having a guiding portion supporting the tubular member and guiding a switchover between the open position and the closed position of the tubular member.

In this embodiment, the tubular member is disposed perpendicular to the axis of the container and serves as a nozzle. The position of the inflow portion of the tubular portion changes and closes and opens the communication with the outflow valve mechanism. In this case, the inflow portion is opened when the pump is in use, i.e., the outflow valve mechanism is either opened or closed. The inflow portion is closed when the pump is not in use, i.e., the outflow valve mechanism is closed.

In the above embodiments, various embodiments may also be included: An opening portion communicated with the inflow portion of the tubular member in the open position may be formed in the guiding member. The open position and the closed position may be switched by rotating the tubular member on its shaft center. The guiding member may have a first regulating portion for stopping a rotation of the tubular member in the open position and a second regulating portion for stopping a rotation of the tubular member in the closed position. The discharge pump may comprise a resinous inflow valve mechanism for letting the fluid stored in the fluid-storing portion flow in and a resinous outflow valve mechanism for letting the fluid having flowed in from the inflow valve mechanism flow out. The fluid discharge pump may comprise a resinous bellows member having the inflow opening and outflow opening and deforming from a stretched position in which a relatively large amount of fluid is stored inside the bellows member to a folded-up position in which a relatively small amount of fluid is stored inside it with a pressure being applied to said nozzle head.

Figure 16:
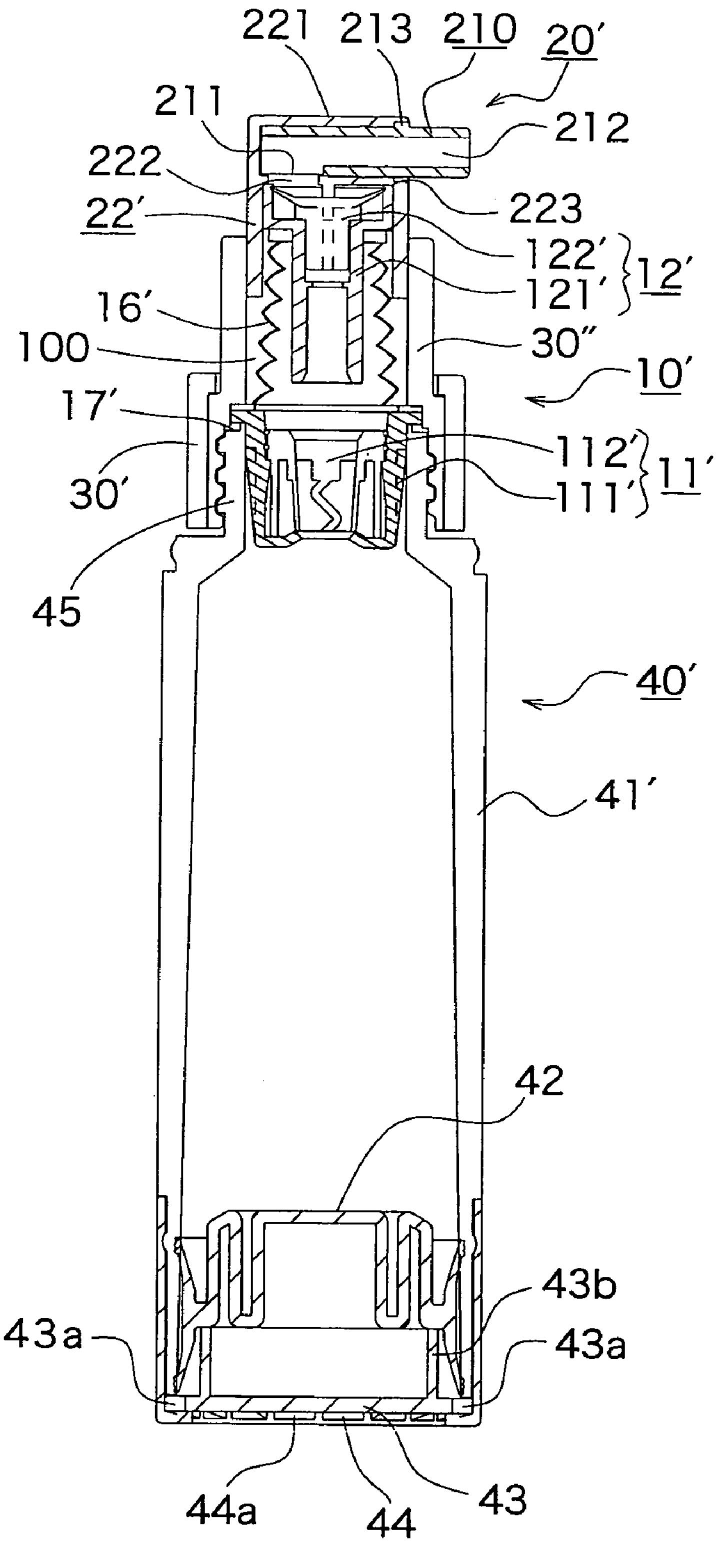
FIG. 16 is a longitudinal view of a fluid container according to Embodiment 3 of the present invention, where a piston is at the bottom of the container.
Figure 17:
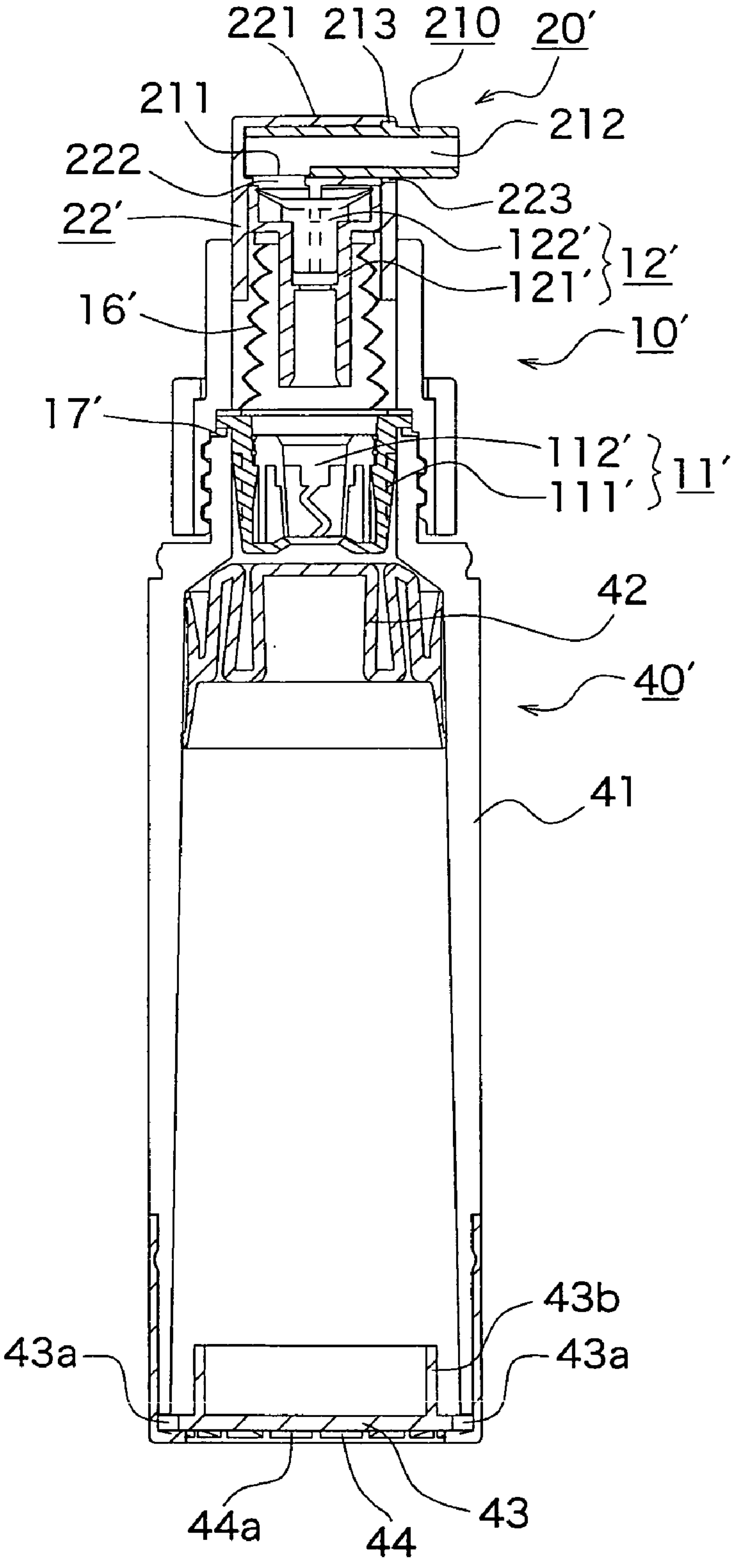
FIG. 17 is a longitudinal view of the fluid container according to Embodiment 3 of the present invention, wherein the piston is at the top of the container.

Preferred embodiments of the present invention in this type are described by reference to drawings. FIGS. 16 to 17 are longitudinal cross-sections of the fluid container according to Embodiment 3 of the present invention.

This fluid container can be used as a container for beauty products for storing gels such as hair gels and cleansing gels, creams such as nourishing creams and cold creams or liquids such as skin lotions used in the cosmetic field. Additionally, this fluid container also can be used as a container for medicines, solvents or foods, etc. In this specification, high-viscosity liquids, semifluids, gels that sol solidifies to a jelly, and creams and regular liquids are all referred to as fluids.

The fluid container according to Embodiment 3 of the present invention comprises a fluid pump 10', a nozzle head 20' switchable between an open position enabling a fluid to pass through between inside and outside the fluid container and a closed position shutting off passage of the fluid, and a fluid-storing portion storing the fluid therein.

Additionally, in this specification, upward and downward directions in FIGS. 16 and 17 are defined as upward and downward directions in the fluid container. In other words, in the fluid container according to Embodiment 3 of the present invention, the side of the nozzle head 20' shown in FIG. 16 is defined as the upward direction; the side of a piston member 42 is defined as the downward direction.

The fluid-storing portion 40' may have a tube-like cylinder member 41', a piston member traveling inside the cylinder member 41' up and down, an inner lid 43 in which multiple air vents **43*a* are formed, and an outer lid 44. The cylinder member 41' in the fluid-storing portion 40' and the fluid discharge pump 10' may be connected liquidtightly via packing 17'. Additionally, if an inflow valve mechanism 11' connected with the cylinder member of the fluid discharge pump 10' is adequately elastic, the packing 17'** can be omitted.

The outer lid 44 may be attached to the lower portion of the cylinder member 41' in a position in which the outer lid 44 holding the inner lid 43 between the outer lid 44 and the lower portion of the cylinder member 41'. In the inner lid 43, the upper side of the bottom **43*b* for positioning the tail end of the piston member 42 inside the fluid-storing container is formed. By changing a height of this upper side of the bottom 43*b***, a storable fluid amount inside the fluid-storing container can be changed.

Additionally, a hole **44*a* may be formed in the central portion of the outer lid 44. Because of this hole, the air can pass through between outside of the fluid container and the air vents 43*a* formed in the inner lid 43**.

The piston member 42 may require a configuration allowing the piston member 42 to travel smoothly inside the cylinder member while achieving high liquidtightness. A configuration of the piston member 42 for serving this purpose is described in detail later.

In this fluid container, by reciprocating the piston member 42 up and down by pressing the nozzle head 20' switched over to the open position, a fluid stored inside the fluid-storing portion 40' is discharged from the nozzle head 20' by the action of the fluid discharge pump 10' described in detail later. As a fluid amount inside the fluid-storing portion 40' decreases, the piston member 42 travels toward the nozzle head 20' inside the cylinder member 41' as shown in FIG. 17. The nozzle head 20' is connected to the container 40' via a cover 30', 30". The cover 30', 30" can be two separate pieces or a single integrated piece.

Figure 18:
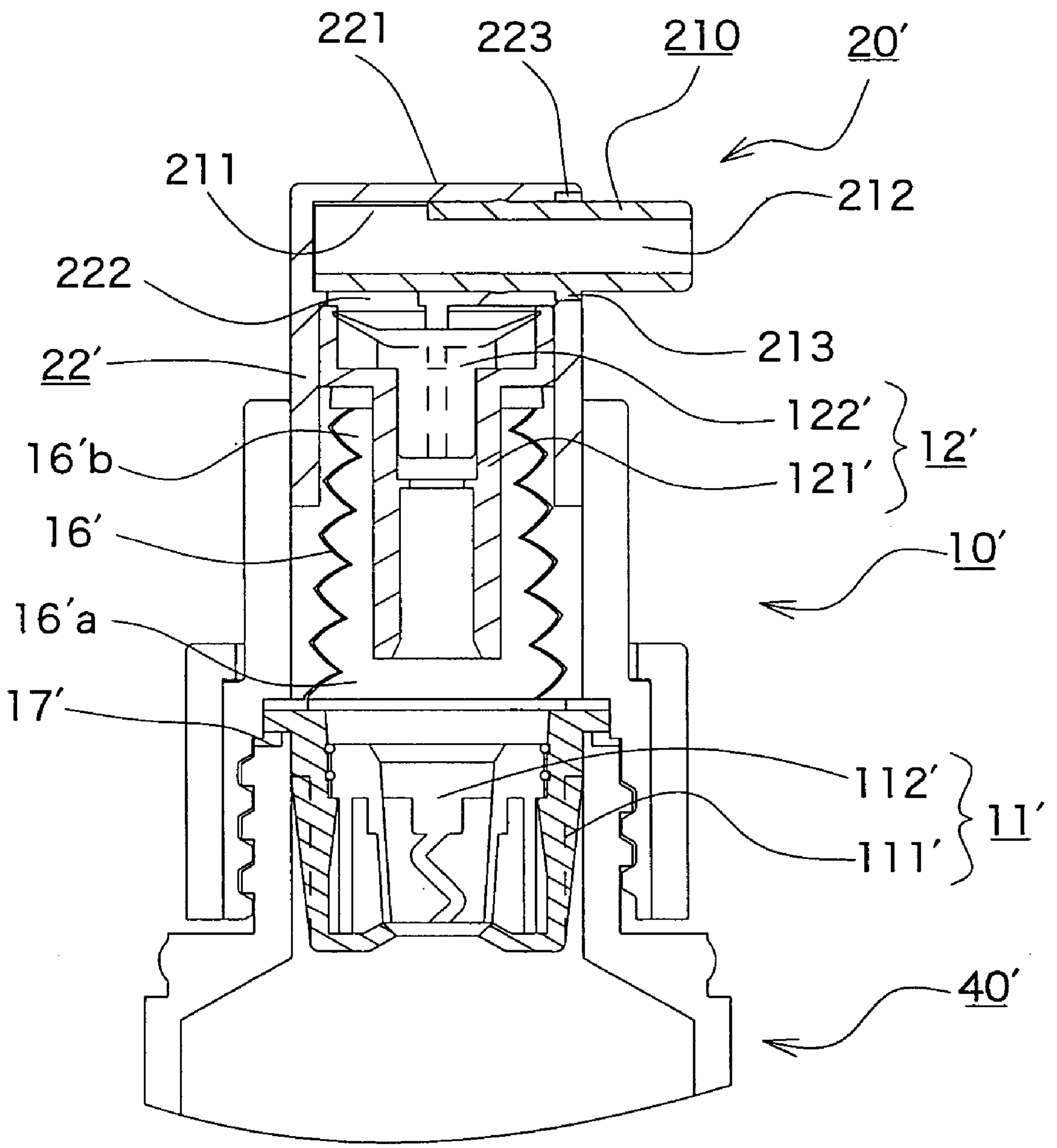
FIG. 18 is an enlarged longitudinal view of the fluid discharge pump 10' the nozzle head 20' in the closed position, wherein an inflow portion 211 is not communicated with an opening portion 222.
Figure 19:
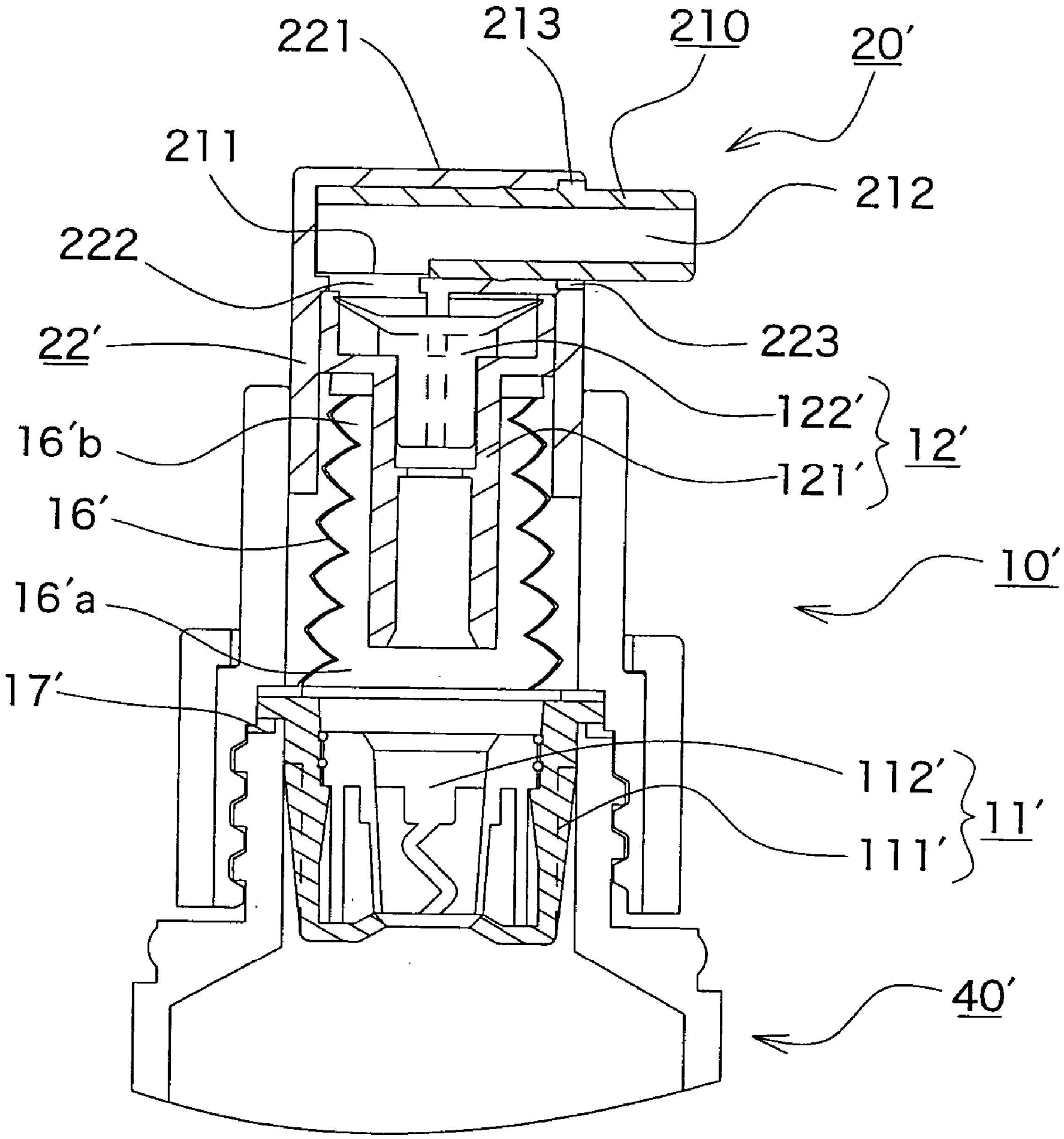
FIG. 19 is a longitudinal view of the fluid discharge pump 10' the nozzle head 20' in the open position, wherein the inflow portion 211 is communicated with the opening portion 222.

FIG. 18 is a longitudinal cross section showing the fluid discharge pump 10' and the nozzle head 20' in the closed position; FIG. 19 is a longitudinal cross section showing the fluid discharge pump 10' and the nozzle head 20' in the open position.

The fluid discharge pump 10' may comprises a resinous bellows member 16' having an inflow opening **16'*a* and an outflow opening 16'*b*, the resinous inflow valve mechanism 11 fixed in the inflow opening 16'*b* of the bellows member 16' and the resinous outflow valve mechanism 12' fixed in the outflow opening 16'***b* of the bellows member. The inflow valve mechanism 11' here is used for letting a fluid stored inside the fluid-storing portion 40' flow into the fluid discharge pump 10' as the bellows member 16' stretches; the outflow valve mechanism 12' is used for letting the fluid having flowed into the fluid discharge pump flow out to the nozzle head as the bellows member 16' folds up.

Figure 20:
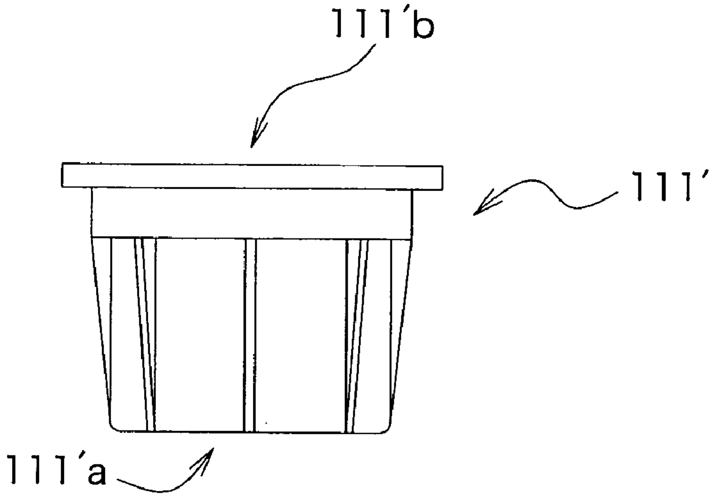
FIGS. 20(*a*)–(*c*) are a side view, cross sectional view, and bottom view, respectively, showing an inflow valve seat member 111' in an embodiment comprising an inflow valve mechanism 11' in the fluid discharge pump 10'.
Figure 20:
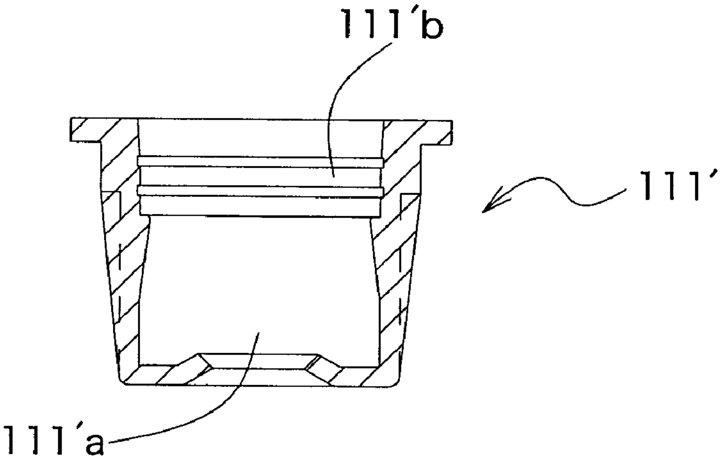
Figure 20:
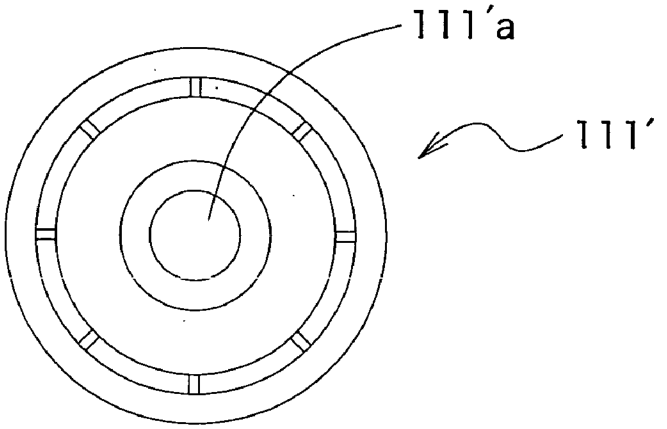
Figure 21A:
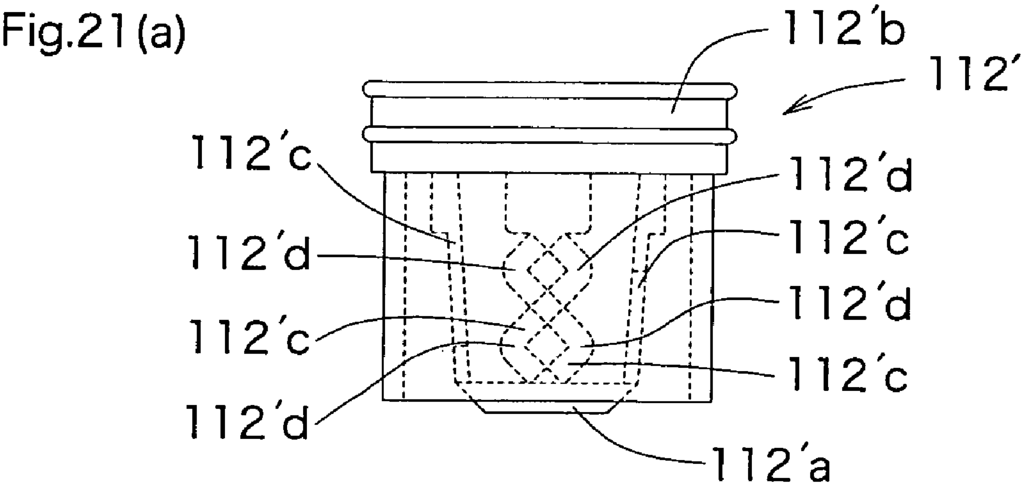
FIGS. 21(*a*)–(*c*) are a side view, cross sectional view, and bottom view, respectively, showing an inflow valve member 112' in an embodiment comprising the inflow valve mechanism 11' in the fluid discharge pump 10'.
Figure 21B:
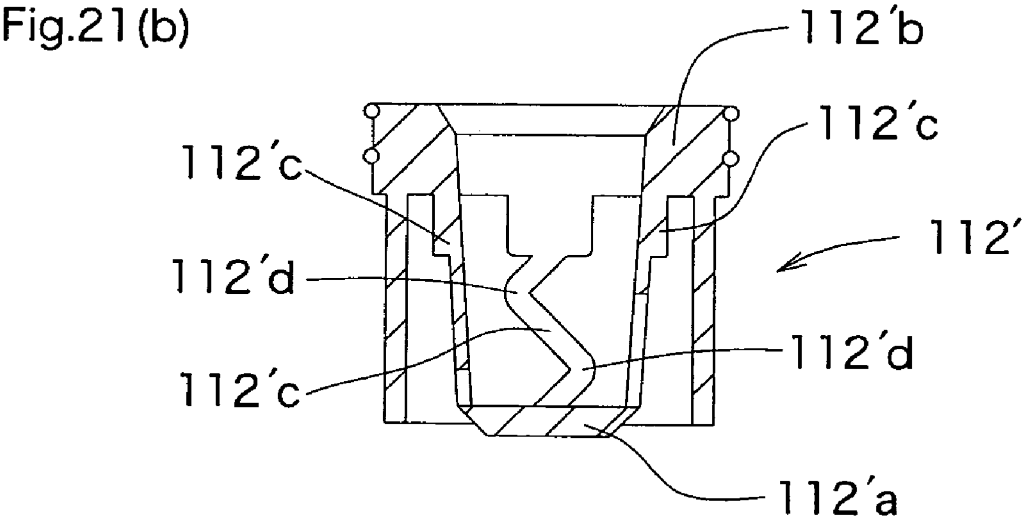
Figure 21C:
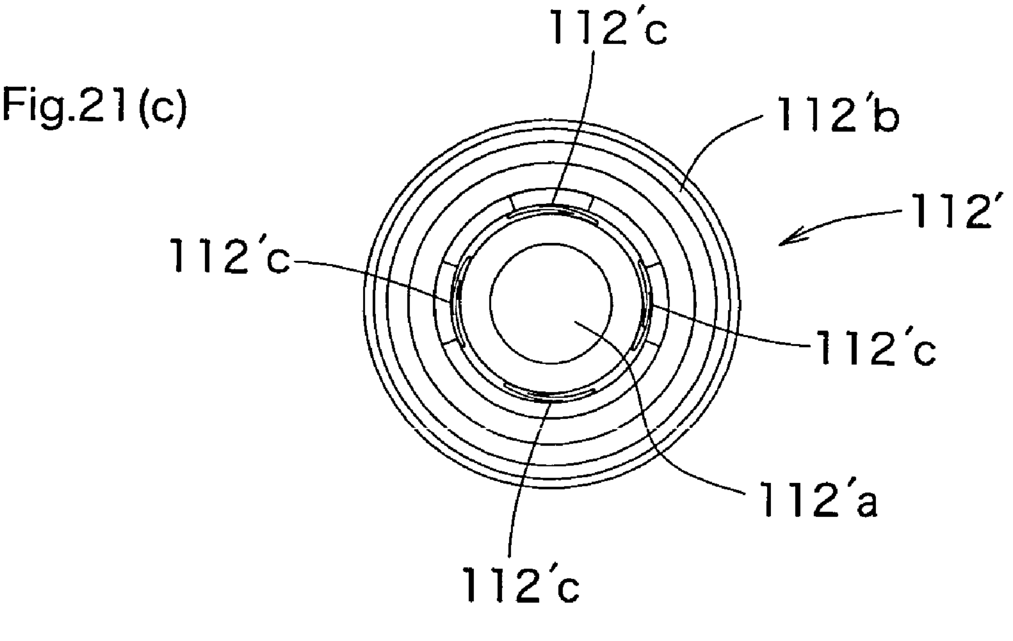

FIG. 20(*a*) is a front view of an outflow valve member 111' comprising the outflow valve mechanism in the fluid discharge pump 10'; FIG. 20(*b*) is a lateral cross section of the same; FIG. 20(*c*) is a backside view of the same. FIG. 21(*a*) is a front view of the inflow valve seat member 112' comprising the inflow valve mechanism 11' in the fluid discharge pump 10'; FIG. 21(*b*) is a cross section of the same; FIG. 21(*c*) is a backside view of the same. These are embodiments of the present invention, and the present invention is not intended to be limited thereto.

As shown in FIGS. 20(*a*)–(*c*), the inflow valve seat member 111' may comprise an opening portion 111'*a* for letting a fluid inside the fluid-storing portion 40' flow in, and a joined portion 111'*b* to be joined with the inflow valve member 112' described later.

As shown in FIGS. 21(*a*)–(*c*), the inflow valve member 112' may comprise a valve body 112'*a* having a shape corresponding to a shape of the opening portion 111'*a* of the inflow valve seat member 111', a supporting portion 112'*b* fixed in the joined portion. 111'*b* of the inflow valve seat member 111', and four coupling portions 112'*c* for coupling the valve body 112'*a* and the supporting portion 112'*b*. The respective four coupling portions 112'*c* have one pair of flexions 112'*d*, hence adequate flexibility is provided.

Figure 22:
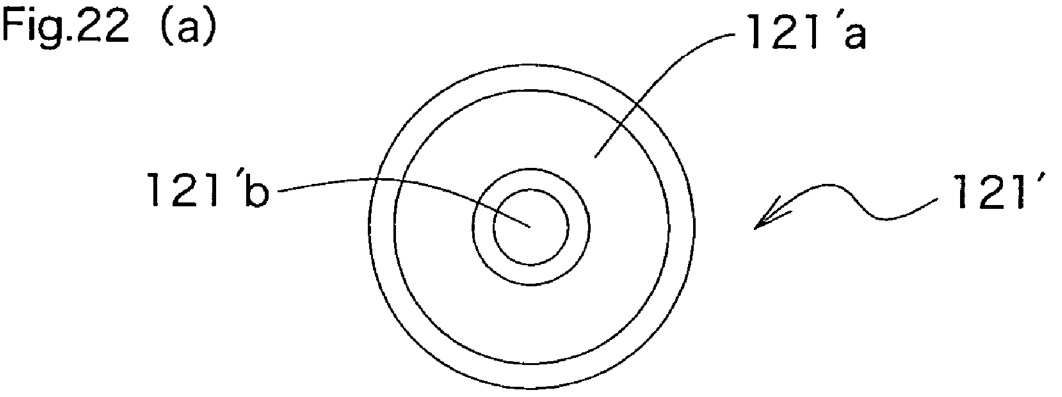
FIGS. 22(*a*)–(*c*) are a top view, cross sectional view, and bottom view respectively, showing an outflow valve seat member 121' in an embodiment comprising the outflow valve mechanism 12' in the fluid discharge pump 10'.
Figure 22:
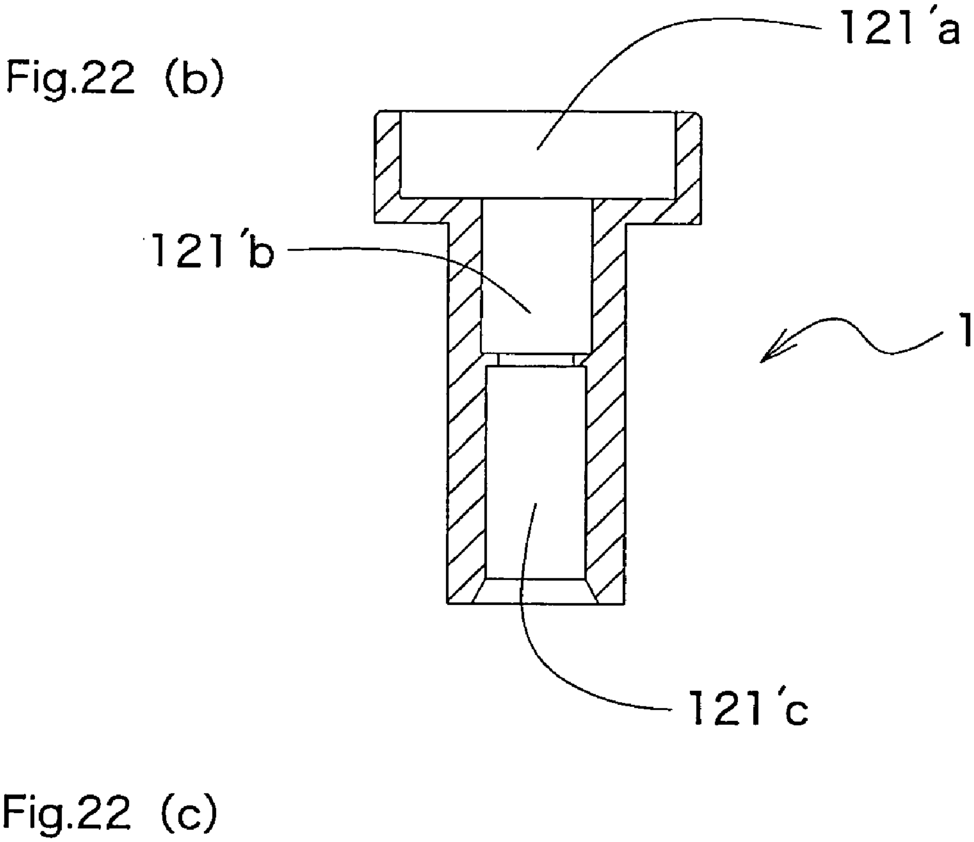
Figure 22:
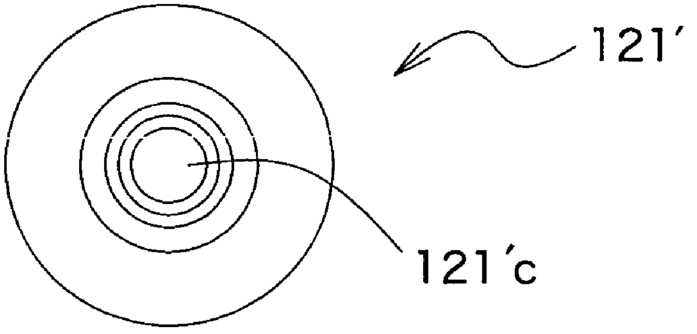
Figure 23A:
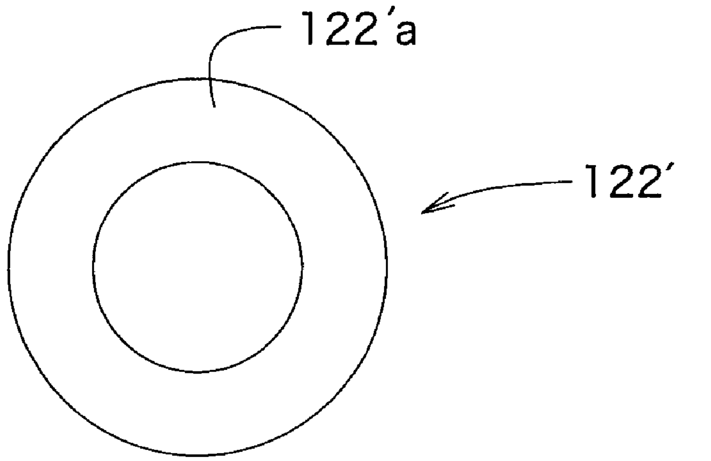
FIGS. 23(*a*)–(*c*) are a top view, side view, and bottom view, respectively, showing an outflow valve member 122' in an embodiment comprising the outflow valve mechanism 12' in the fluid discharge pump 10'.
Figure 23B:
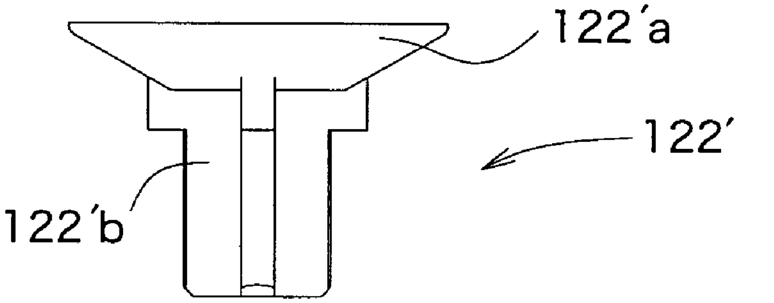
Figure 23C:
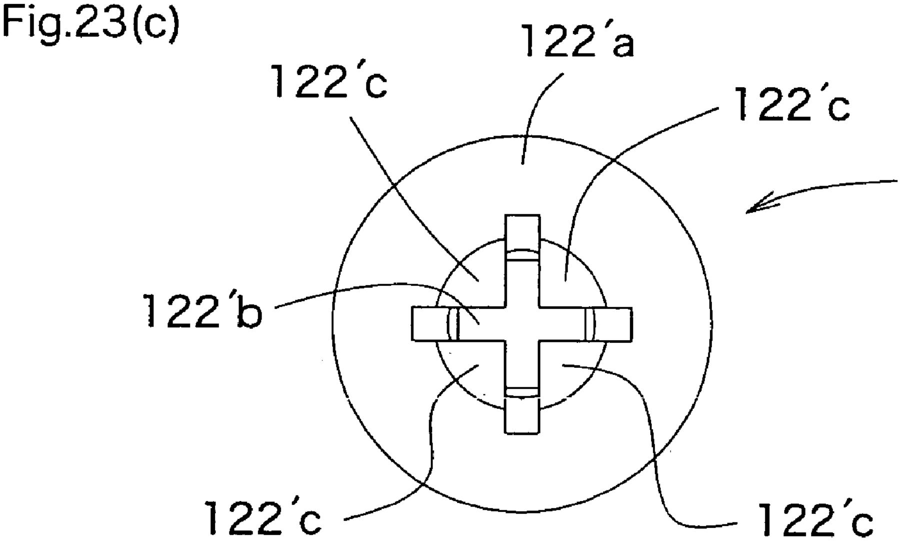

FIG. 22(*a*) is a plane view showing an outflow valve seat member 121' comprising an outflow valve mechanism 12' in the fluid discharge pump 10'; FIG. 22(*b*) is a lateral view of the same; FIG. 22(*c*) is a backside view of the same. FIG. 23(*a*) is a plane view showing an outflow valve member 122' comprising then outflow valve mechanism 12' in the fluid discharge pump 10'; FIG. 23(*b*) is a lateral view of the same; FIG. 23(*c*) is a backside view of the same.

As shown in FIGS. 22(*a*)–(*c*), the outflow valve seat member 121' may comprise an opening portion 121'*a*, a joined portion 121'*b* joined with the outflow valve member 122' described later, and an inflow portion 121'*c* for letting a fluid inside the fluid discharge pump 10' flow in.

As shown in FIGS. 23(*a*)–(*c*), the outflow valve member 122' may comprise a nearly dish-shaped flexible valve portion 121'*a* contacting an inner surface of the opening portion 121'*a* of the outflow valve seat member 121', and a base portion 122'*b* joined with the joined portion 121'*b* of the outflow valve seat member 12'. In the base portion 122'*b*, a passage groove 122'*c* for letting the fluid flow in is formed.

Figure 24:
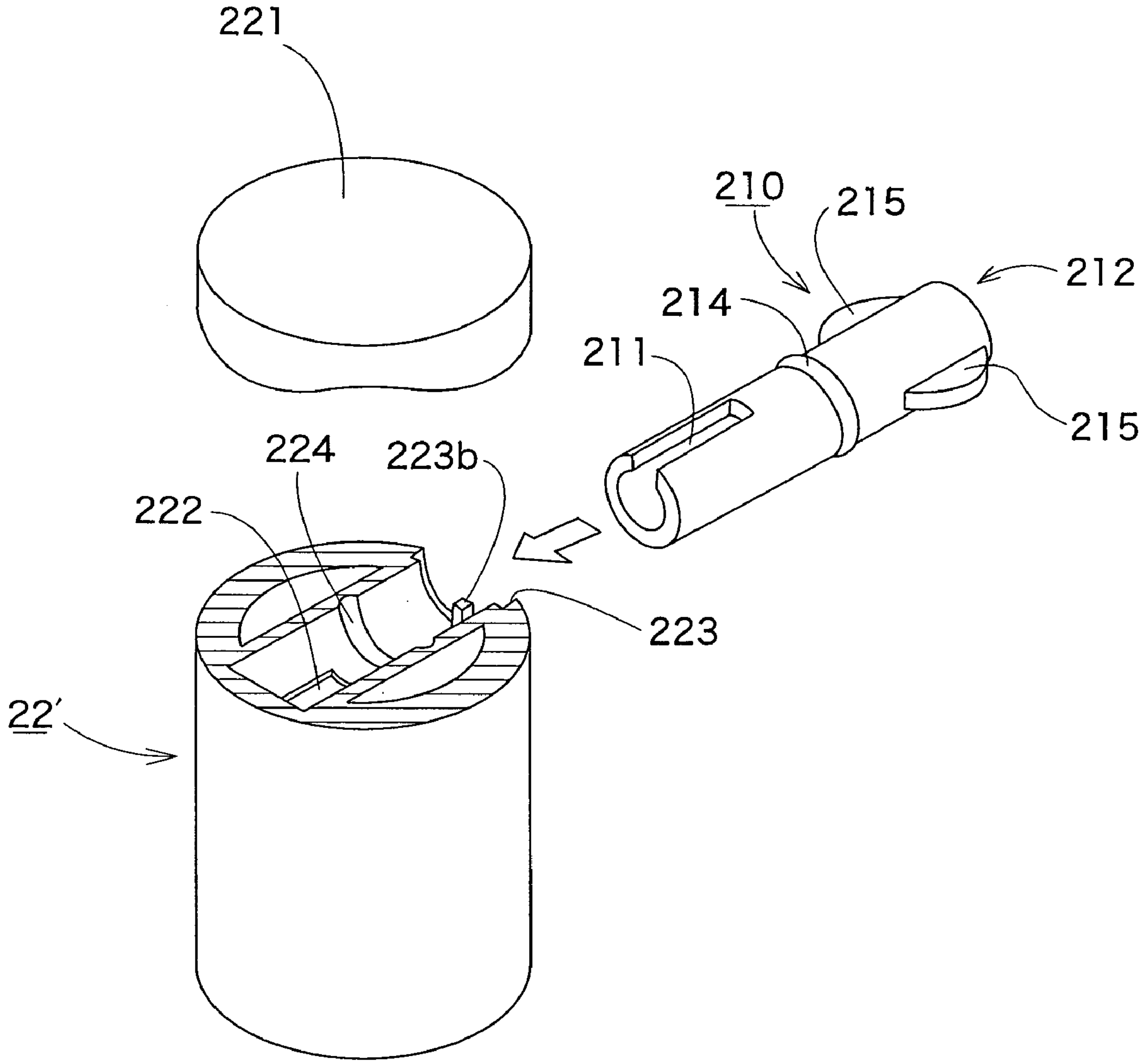
FIG. 24 is an explanatory view showing dismantling the nozzle head 20' in a closed position in an embodiment.
Figure 25:
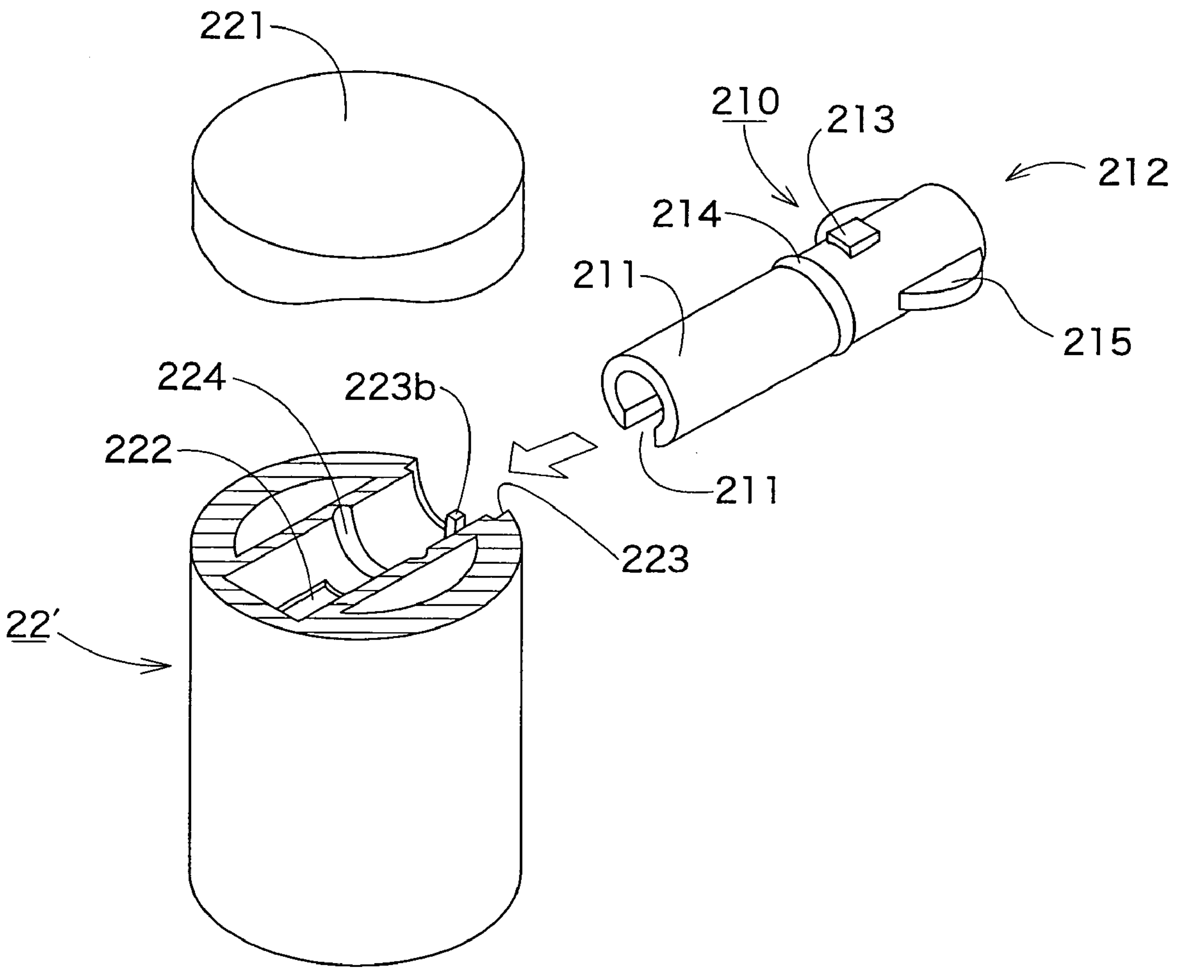
FIG. 25 is an explanatory view showing dismantling the nozzle head 20' in an open position in an embodiment.

FIG. 24 is an explanatory cutaway view showing a portion of the nozzle head 20' in the closed position in an embodiment; FIG. 25 is an explanatory cutaway view showing a portion of the nozzle head 20' in the open position in an embodiment.

The nozzle head 20' has a cylindrical member 210 and a guiding member 22'.

The cylindrical member 210 has an inflow portion 211 for letting the fluid flow in from the outflow valve mechanism 12' in the fluid discharge pump described later, an outflow portion 212 for letting the fluid having flowed in from the inflow portion 211 flow out, a convex portion 213 guided by the guiding member 22', and an engaging portion 214.

The guiding member 22' has a pushing portion 221, an opening portion 222 communicated with the inflow portion 211 of the cylindrical member 210 in an open position, a guiding portion 223 guiding a switchover between an open position and a closed position of the cylindrical member 210 described later, and a groove portion 224 having a shape corresponding to the engaging portion 214 of the cylindrical member 210.

As for the cylindrical member 210 and the guiding member 22', the engaging portion 214 of the cylindrical member 210 is fitted in the groove portion 224 in the guiding member 22'. By this, the cylindrical member 210 is supported rotatably on its shaft center against the guiding member.

With the above-mentioned configuration provided, it is possible to switch the nozzle head 20' between the open position and the closed position: In the open position, the inflow portion 211 of the cylindrical member 210 and the opening portion 222 of the guiding member 22' are communicated, and fluid passage between the inflow portion 211 of the cylindrical member 210 and the outflow valve mechanism described later is enabled; in the closed position, fluid passage between the inflow portion 211 and the outflow valve mechanism 12' is shut off. Consequently, when the nozzle head 20' is switched over to the closed position, it becomes possible to fully prevent leaking out of the fluid from the fluid container.

Figure 26:
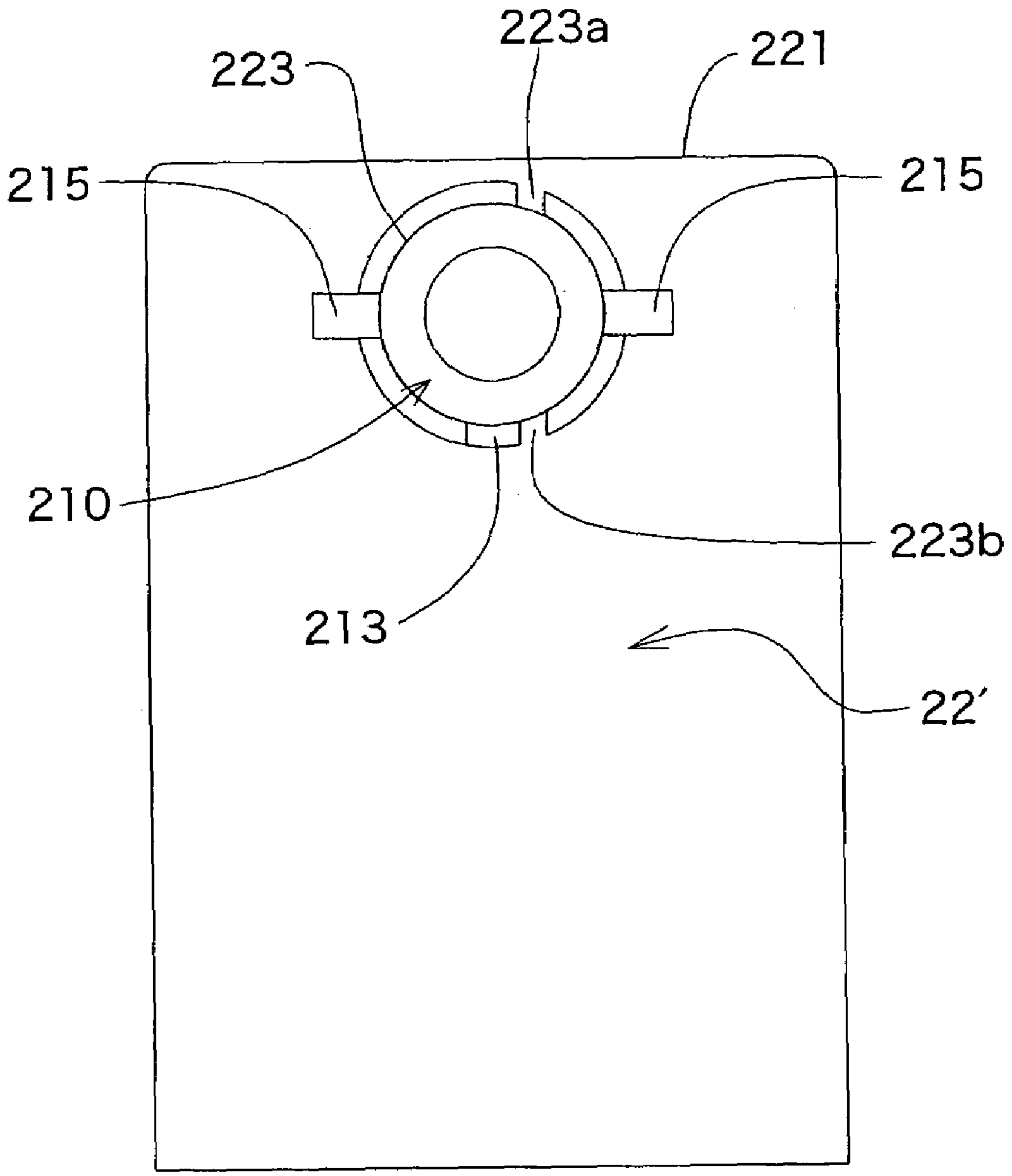
FIG. 26 is a front view of the nozzle head 20' in the closed position.
Figure 27:
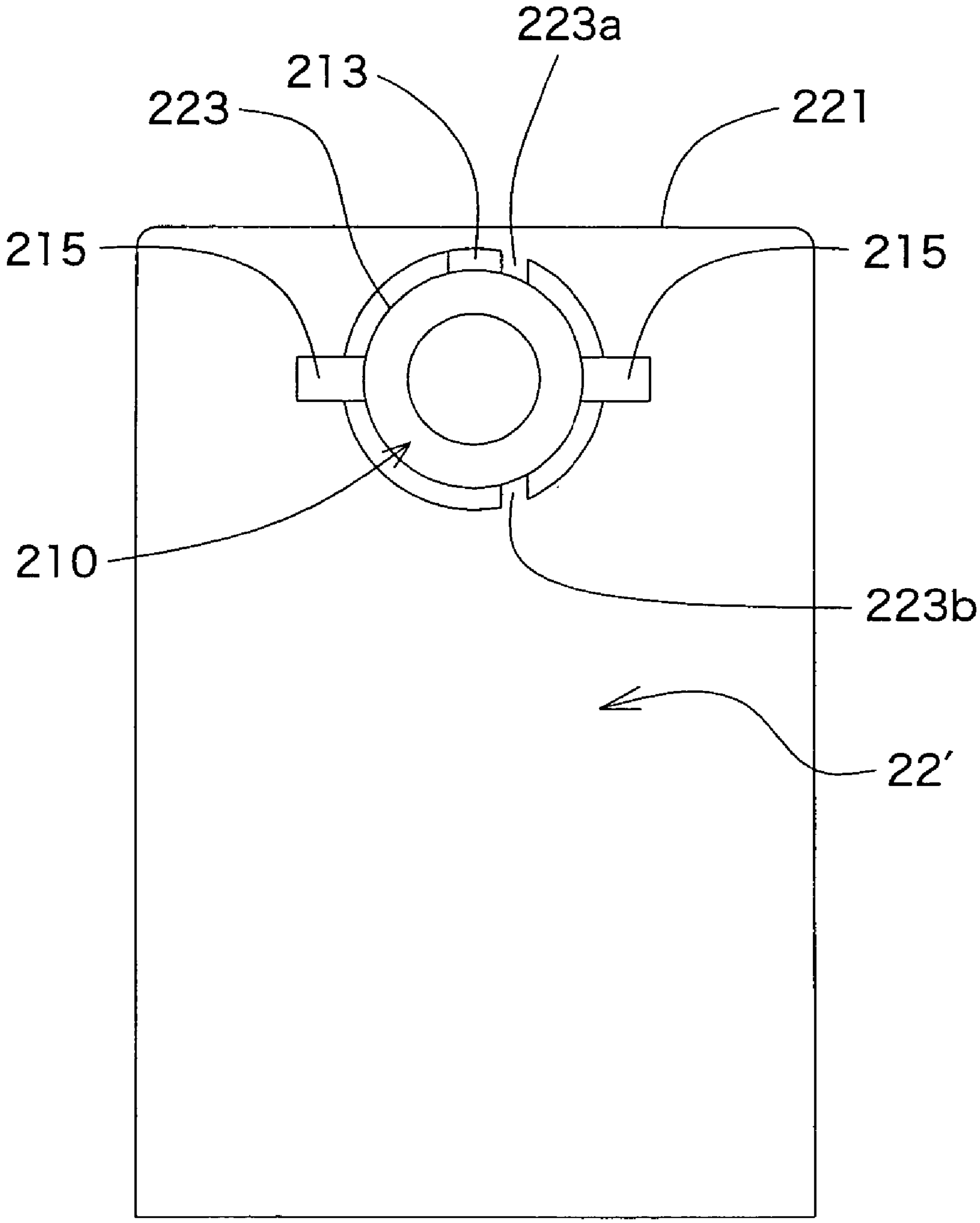
FIG. 27 is a front view of the nozzle head 20' in the open position.

FIG. 26 is a front view of the nozzle head 20' in the closed position; FIG. 27 is a front view of the nozzle head 20' in the open position.

Switching over of the nozzle head 20' between the open position and the closed position can be achieved by rotating the cylindrical member 210 on its shaft center against the guiding member 22'. At this time, the convex portion 213 of the cylindrical member 210 is guided by the guiding portion 223 of the guiding member 22'.

Additionally, the guiding member 22' has a first regulating portion 223*a* and a second regulating portion 223*b*. The first regulating portion 223*a* stops a rotation of the cylindrical member by contacting the convex portion 213 of the cylindrical member 210 in the open position; the second regulating portion stops a rotation of the cylindrical member by contacting the convex position 213 of the cylindrical member 210 in the closed position. By these first regulating portion 223*a* and second regulating portion 223*b*, a switchover between the open position and the closed position can be achieved easily. The mechanism described can be accomplished by other configurations and is not intended to limit the present invention.

Fluid discharge actions in the above-mentioned fluid container are described below.

Figure 28:
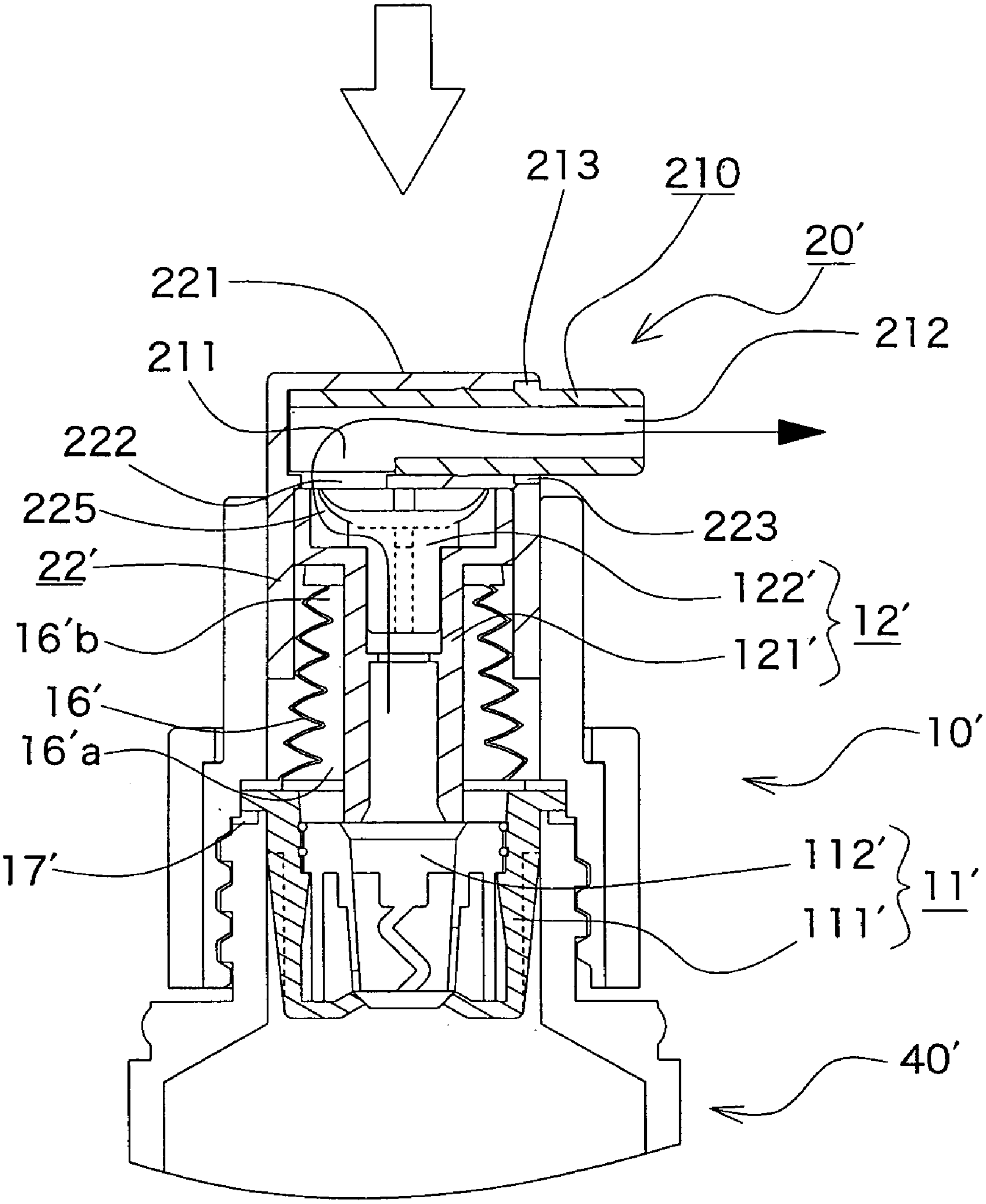
FIG. 28 is an enlarged longitudinal view showing the fluid discharge pump 10' and the nozzle head 20' in the open position, where the nozzle head is pressed.
Figure 29:
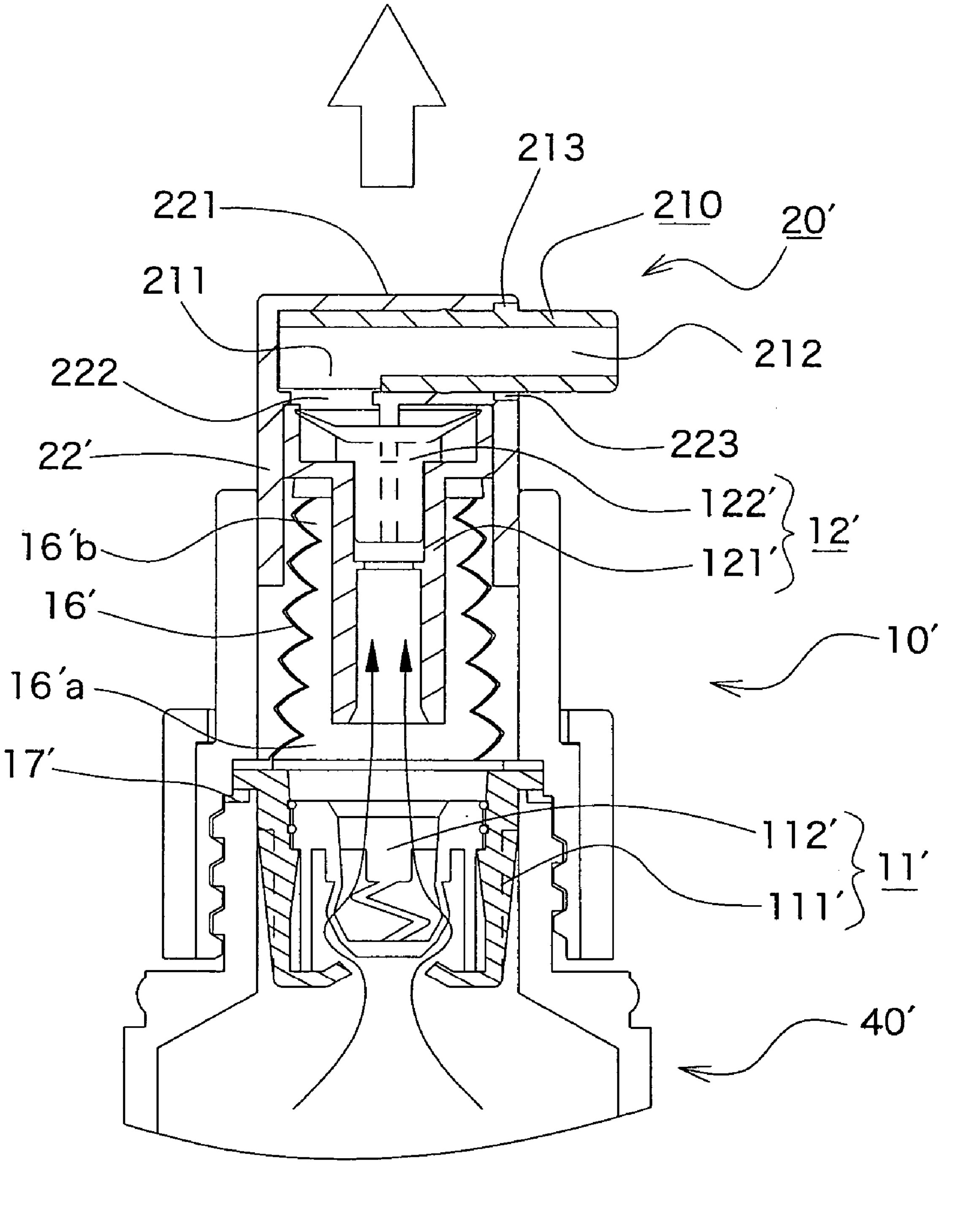
FIG. 29 is an enlarged longitudinal view showing the fluid discharge pump 10' and the nozzle head 20' in the open position, wherein the nozzle head is released.

FIGS. 28 and 29 are longitudinal cross sections showing the fluid discharge pump 10' and the nozzle head 20' in the open position. Of these, FIG. 28 shows a position in which, with the pushing portion 221 in the nozzle head 20' being pressed, the bellows member 16' is deforming to a folded-up position in which it holds a relatively small amount of fluid from a stretched position in which it holds a relatively large amount of fluid inside it; FIG. 29 shows a position in which, with a pressure applied to the pushing portion 221 in the nozzle head 20' removed, the bellows member 16' is deforming back to the stretched position again.

As shown in FIG. 28, when the pushing portion 221 in the nozzle head 20' is pressed, a capacity of the bellows member 16' reduces and inside the fluid discharge pump 10' is pressurized. By this, the valve body 112'*a* of the inflow valve member 112' is disposed in a position in which it contacts the opening portion 111'*a* of the inflow valve seat member 111' and the opening portion 111'*a* is closed; simultaneously, the valve body 122'*a* of the outflow valve member 122' is disposed in a position in which it separates from the opening portion 121'$a$ of the outflow valve seat member 121' and the opening portion 121'$a$ is open. Consequently, the fluid inside the fluid discharge pump 10' flows out to the outflow portion 212 of the nozzle head 20' in the open portion.

As shown in FIG. 29, when a pressure applied to the pushing portion 221 in the nozzle head 20' is removed, a capacity of the bellows member 16' expands by the resilience of the bellows member 16' and inside the fluid discharge pump is depressurized. By this, the valve body 112'$a$ of the inflow valve member 112' is disposed in a position in which it separates from the opening portion 111'$a$ of the inflow valve seat member; simultaneously, the valve body 122'$a$ of the outflow valve member 122' is disposed in a position in which it contacts the opening portion 121'$a$ of the outflow valve seat member 121'. Consequently, the fluid stored inside the fluid-storing portion 40' can flow into the fluid discharge pump 10'.

A configuration of the fluid-storing portion 40' is described below.

The cylinder member 41' used for this fluid-storing portion 40' may be made of an injection molded resin. Consequently, as shown in FIGS. 16 and 17, for production process convenience' sake, a tip of the cylinder member 41' has a tapered shape.

Figure 30A:
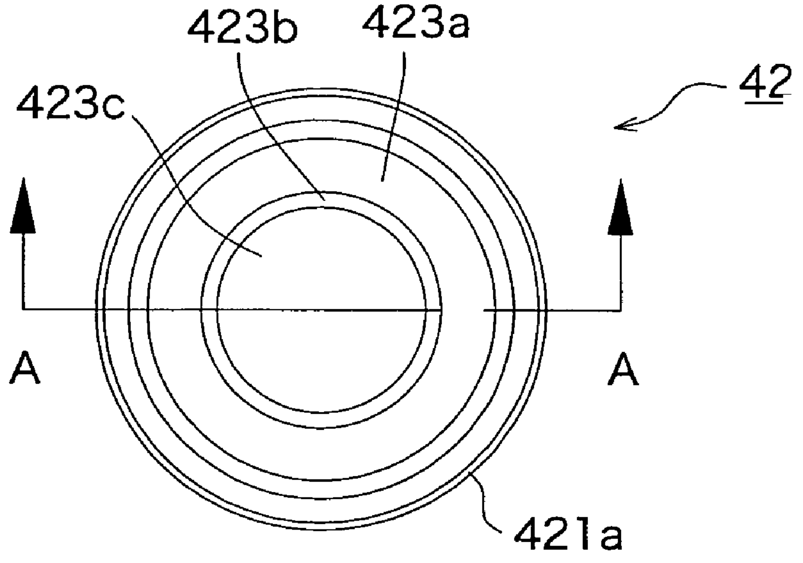
FIGS. 30(*a*)–(*c*) are a top view, side view, and cross sectional view of line A—A, respectively, showing a piston member 42 in an embodiment comprising the fluid-storing portion 40.
Figure 30B:
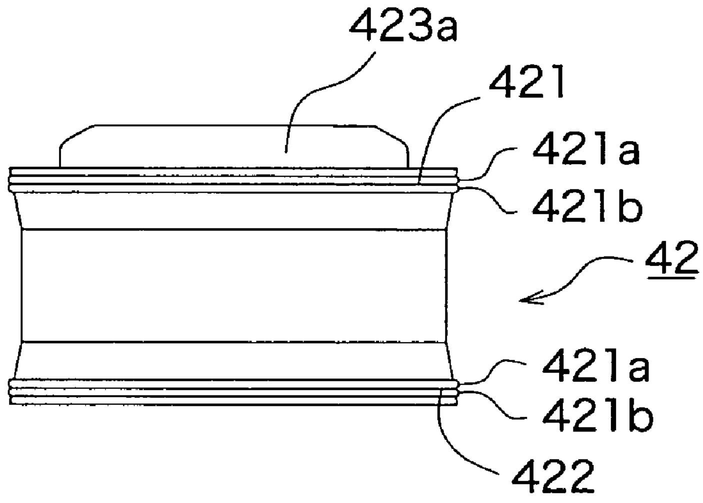
Figure 30C:
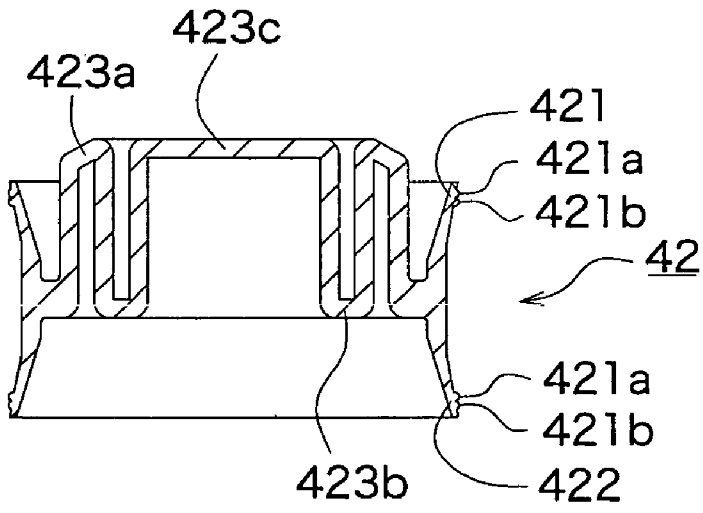

FIG. 30(*a*) is a plane view showing the piston member 42 comprising the fluid-storing portion 40'; FIG. 30(*b*) is a front view of the same; FIG. 30(*c*) is a cross section showing an A—A section in FIG. 30(*a*).

On the upper side of this piston member 42, a liquidtight portion 421 contacting an inner circumference of the cylinder member 41' is formed; on the underside of the piston member 42, a liquidtight portion 422 contacting an inner circumference of the cylinder member 41' is formed. In other words, on an outer peripheral surface of the piston member 42, a pair of liquidtight portions 421, 422 respectively contacting an inner circumference of the cylinder member 41' is disposed apart from each other at a certain distance.

A contacting portion in the liquidtight portion 421, which contacts an inner circumference of the cylinder member 41', comprises a pair of convex portions 421$a$, 421$b$ disposed adjacently. A contacting portion in the liquidtight portion 422, which contacts an inner circumference of the cylinder member 41', comprises a pair of convex portions 422$a$, 422$b$ disposed adjacently.

In this piston member 42, by the action of a pair of liquidtight portions 421, 422, which are disposed apart from each other at a certain distance, the shaft center of the piston member 42 and the shaft center of the cylinder member 41' always can be brought in line regardless of a direction of stress applied to the piston member 42. Consequently, it becomes possible for the piston member 42 to smoothly travel inside the cylinder member 41'.

Additionally, in the piston member 42, concentric flexions 423$a$, 423$b$, 423$c$ with the liquidtight portions 421, 422, which serve as contacting portions contacting the inner circumference of the cylinder member 41', are formed in a plane perpendicular to a traveling direction of the piston member inside the cylinder member 41'. The piston member 42, therefore, has momentum from the central portion to an outer perimeter in a plane perpendicular to a traveling direction of the piston member inside the cylinder member 41' and is configured to be capable of expanding and contracting according to a shape of the inner circumference of the cylinder member 41'. Consequently, in the case of the cylinder member 41' having a tapered shape toward a nozzle head direction or the cylinder member 41' having a low accuracy, i.e., having an uneven internal surface, it becomes possible to secure adequate liquidtightness for the cylinder member 41' and the piston member 42, not by altering an inside diameter of the cylinder 41'.

Furthermore, because more flexions are formed above the central portion of the piston member 42 than below the central portion, as shown in FIG. 17, it becomes possible to get relatively a small amount of the fluid remaining inside the fluid-storing portion 40' when the piston member 42 travels to the most elevated position inside the cylinder member 41'.

Figure 31:
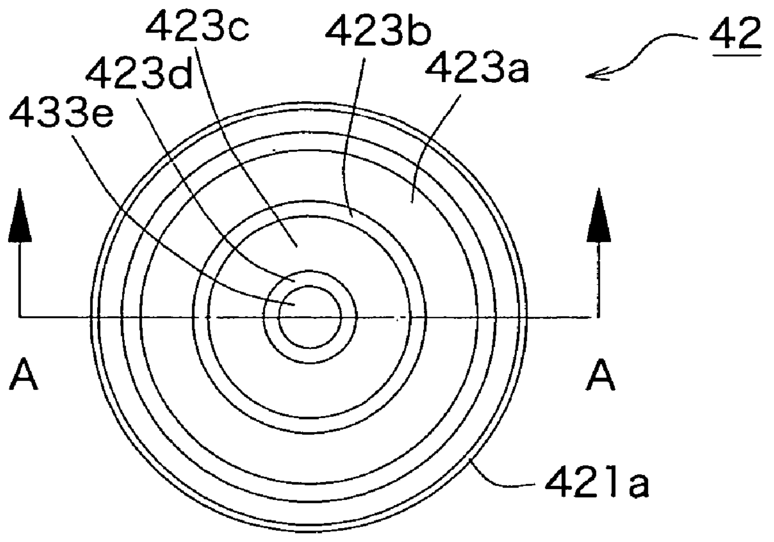
FIGS. 31(*a*)–(*c*) are a top view, side view, and cross sectional view of line A—A, respectively, showing the piston member 42 comprising the fluid-storing portion 40 in an alternative embodiment.
Figure 31:
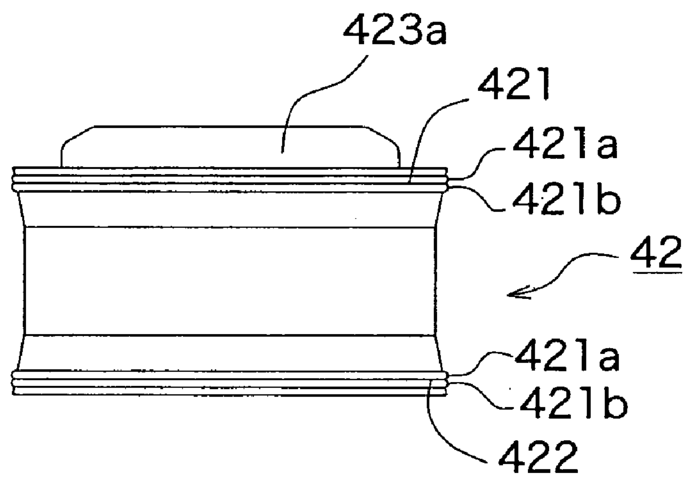
Figure 31:
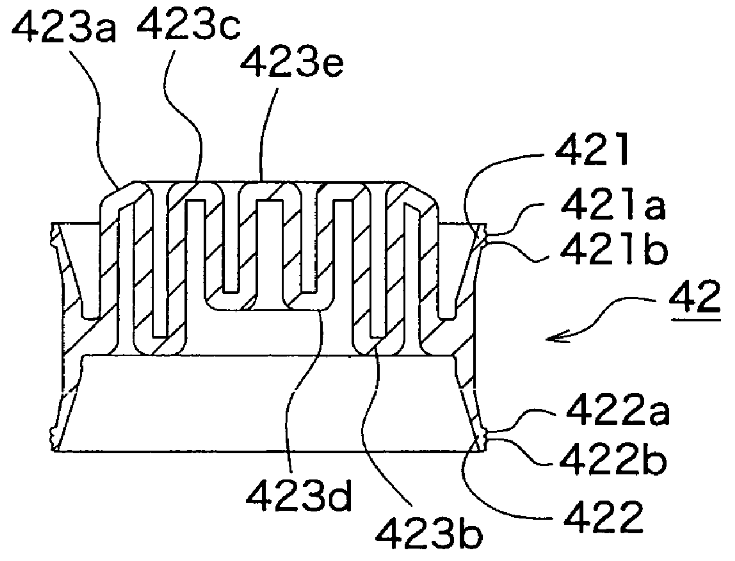

FIGS. 31(*a*)–(*c*) are explanatory views showing the piston member 41' comprising the fluid-storing portion 40' in an alternative embodiment. While three flexions 423$a$, 423$b$, 423$c$ are formed in the piston member 42 in the fluid container according to the aforesaid embodiment, five flexions 423$a$, 423$b$, 423$c$, 423$d$, 523$e$ also can be formed in this embodiment as shown in FIGS. 31(*a*)–(*c*). Additionally, the number of flexions formed can be other than five, or it can be a single one.

Figure 32:
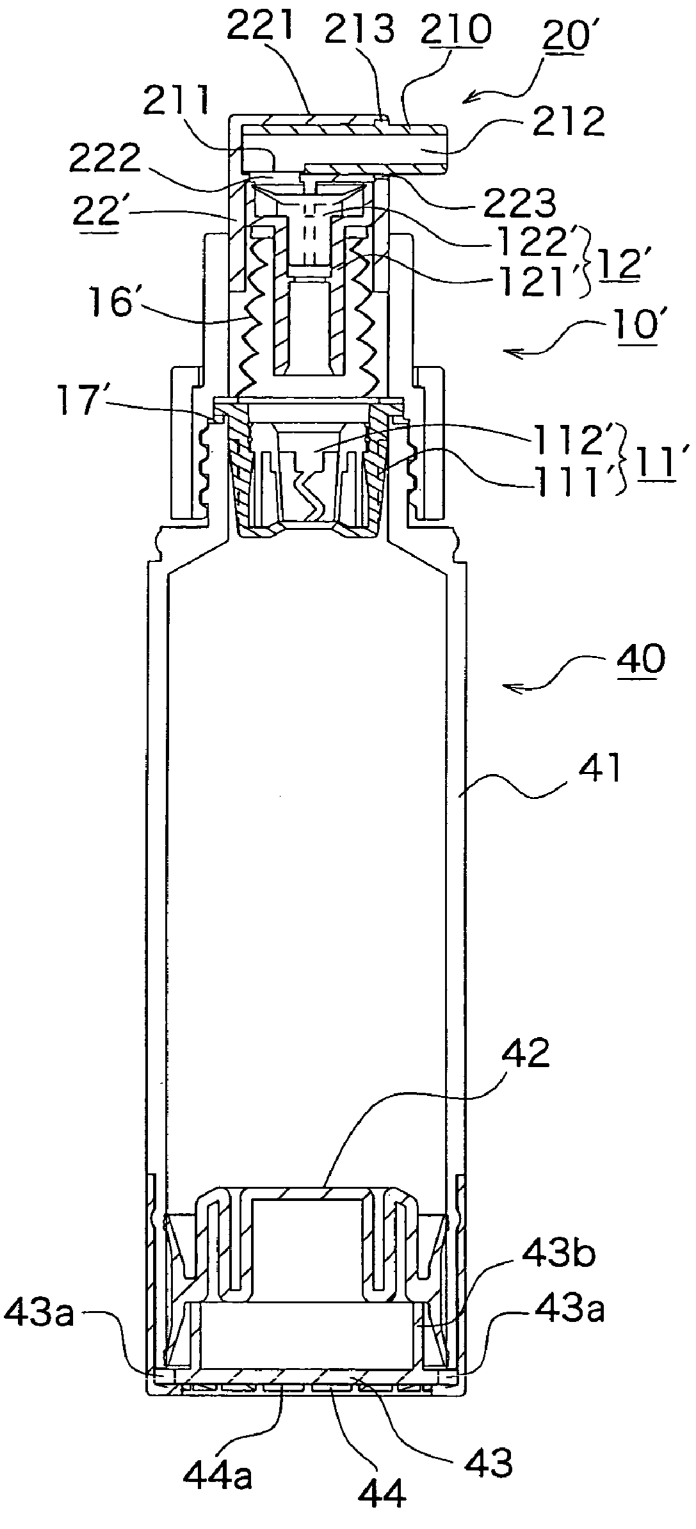
FIG. 32 is a longitudinal view showing a fluid container according to Embodiment 4 of the present invention, where a piston is at the bottom of the container.
Figure 33:
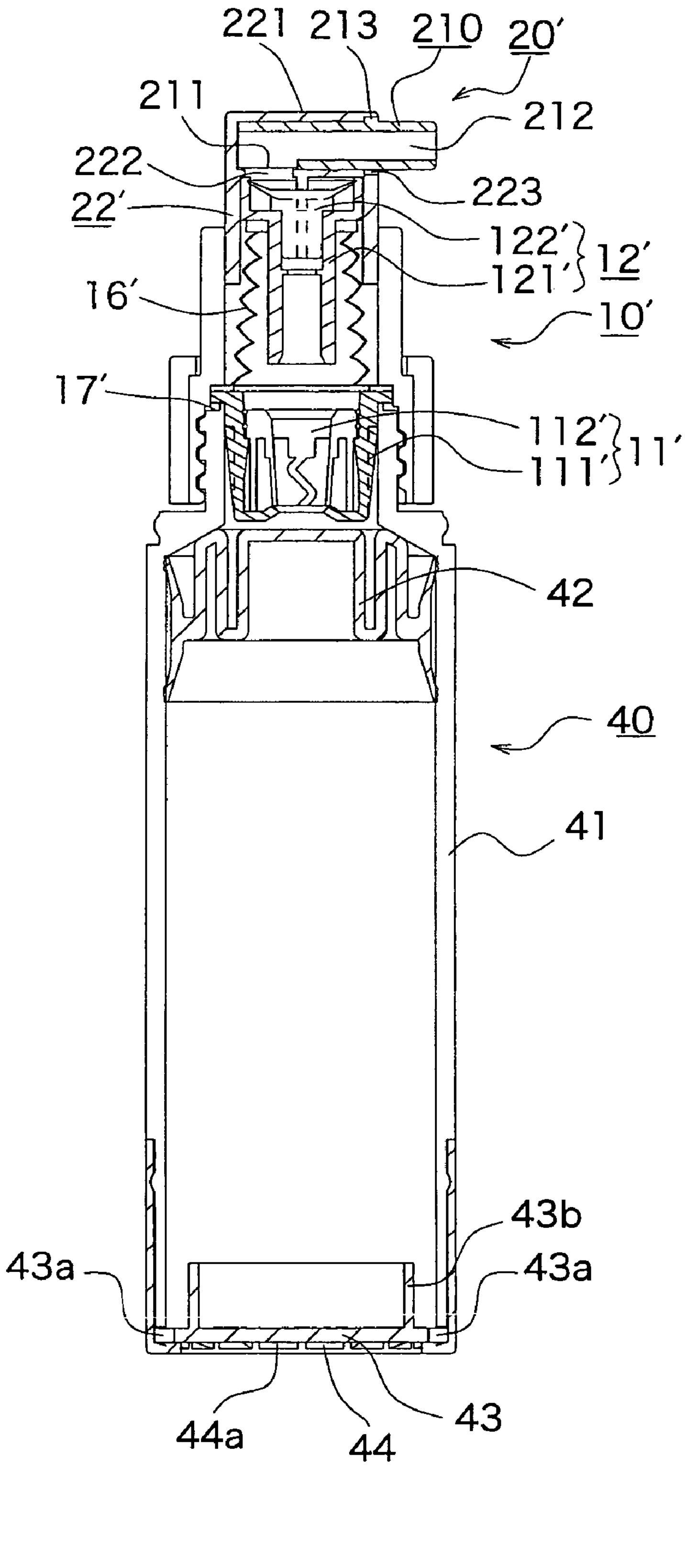
FIG. 33 is a longitudinal view showing the fluid container according to Embodiment 4 of the present invention, wherein the piston is at the top of the container.

FIGS. 32 and 33 are longitudinal cross sections showing the fluid container according to a further alternative embodiment (Embodiment 4). While the cylinder member 41' in the fluid container 40' according to the embodiments previously described has a tapered inner surface, even when a fluid container 40 has a cylinder member 41 not having a tapered inner surface as shown in FIGS. 32 and 33, the piston member 42 shown in FIGS. 30 and 31 also can be used.

As described above, according to an embodiment of the present invention, when the nozzle head comprises the cylindrical member switchable between the open position enabling a fluid to pass through between the inflow portion and the fluid discharge pump and the closed position shutting off fluid passage between the inflow portion and the fluid discharge pump, and the guiding member having a guiding portion guiding a switchover between the open position and closed position of the cylindrical member, leaking out of the fluid from the container can be fully prevented.

According to another embodiment of the present invention, when the open position and the closed position are switched by rotating the cylindrical member on its shaft center, leaking out of the fluid from the container can be fully prevented while a configuration is simple.

According to still another embodiment of the present invention, when the guiding member has the first regulating portion for stopping a rotation of the cylindrical member in the open position and the second regulating portion for stopping a rotation of the cylindrical member in the closed position, it is possible to facilitate a switchover between the open position and the closed position.

According to yet another embodiment of the present invention, when the discharge pump possesses the nozzle head switchable between the open position and the closed position in addition to the resinous inflow valve mechanism and the resinous outflow valve mechanism, leaking out of the fluid from the container can be fully prevented even when resinous valve mechanisms having low liquidtightness are used.

According to additional embodiment of the present invention, when the fluid discharge pump possesses the resinous bellows member having the inflow opening and outflow opening and deforming from a stretched position in which a relatively large amount of fluid is stored inside the bellows member to a folded-up position in which a relatively small amount of fluid is stored inside it with a pressure applied to the nozzle head, leaking out of the fluid from the container can be fully prevented while a configuration is simple.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A fluid discharge pump for discharging a fluid stored inside a fluid-storing portion, comprising:

an outer cover being adapted to be connected to an upper portion of the fluid-storing portion and having a through-hole in its axis;

a nozzle head being provided with a fluid discharge nozzle and being movable inside the cover in the axis;

a first valve mechanism for inflow adapted to be connected to an opening of the upper portion of the fluid-storing portion;

a second valve mechanism for outflow connected inside the nozzle head;

a bellows member being connecting the first valve mechanism and the second valve mechanism and deforming from a stretched position to a folded-up position, thereby changing an amount of fluid in contact with and stored inside the bellows member, wherein when pressure inside the bellows member increases by downward movement of the nozzle head, the first valve mechanism closes and the second valve mechanism opens, and when pressure inside the bellows member decreases by upward movement of the nozzle head, the first valve mechanism opens and the second valve mechanism closes; and a third valve mechanism for anti-leakage disposed between the nozzle and the second valve mechanism inside the nozzle head, wherein when the second valve mechanism opens, the third valve mechanism opens, and when the second valve mechanism closes or is not in use, the third valve mechanism closes, wherein the third valve mechanism comprises:

a tubular member connecting the nozzle and the second valve mechanism in the nozzle head and having a flexion flexed inward between the nozzle and the second valve mechanism; and a contact portion being disposed inside the tubular member and having an upper end fixed to the nozzle head and a lower end with an enlarged portion which has a diameter larger than an inner diameter of the flexion and is in contact with the flexion to close the flexion, wherein when the nozzle head descends, the contact portion moves relative to the tubular member to be detached from the flexion to open the flexion.

2. A fluid discharge pump for discharging a fluid stored inside a fluid-storing portion, comprising:

a nozzle head disposed on an upper side of the fluid-storing portion, said nozzle head being pressed for discharging the fluid from the fluid-storing portion;

a bellows member having an inflow opening and an outflow opening and deforming from a stretched position in which the bellows member holds a relatively large amount of fluid therein to a folded-up position in which the bellows member holds a relatively small amount of fluid therein when compressed by the nozzle head;

a resinous inflow valve mechanism coupled with the inflow opening of the bellows member;

a resinous outflow valve mechanism coupled with the outflow opening of the bellows member and capable of moving relatively to the nozzle head;

a tubular member having a first supporting portion coupled with the nozzle head, a second supporting portion coupled with the outflow valve mechanism, and a tubular coupling portion in which a flexion is formed and which couples the first supporting portion and the second supporting portion in a position in which momentum is given in a direction of the supporting portions separating from each other; and a contacting portion having a joined portion, one end of which is coupled with the nozzle head and which is inserted into the flexion of the tubular member, and a lid portion formed at the other end of the joined portion and contacting a surface of the flexion in the coupling portion of the tubular member, wherein the flexion in the tubular member and the lid portion in the contacting member separate from each other and a fluid flow path is formed, when the nozzle head descends against the outflow valve mechanism.

3. The fluid discharge pump according to claim 2, wherein the inflow valve mechanism comprises:

a valve seat member in which an opening portion for letting the fluid flow in is formed; and a valve member having an annular supporting portion and a valve portion connected to the supporting portion via multiple coupling portions.

4. The fluid discharge pump according to claim 2, wherein the outflow valve mechanism comprises:

a valve seat member in which an opening for letting the fluid flow out is formed; and a valve member having an annular supporting portion and a valve portion connected to the supporting portion via multiple coupling portions.

5. The fluid discharge pump according to claim 2, wherein the nozzle head comprises stoppers restricting a relative travel distance of the outflow valve mechanism.

6. A fluid container comprising a fluid discharge pump for letting a fluid stored inside a fluid-storing portion flow out from a nozzle head disposed on an upper side of the fluid-storing portion by pressing the nozzle head in a pressing direction, said nozzle head comprising:

a tubular member having an inflow portion for letting the fluid flow in from the fluid discharge pump and an outflow portion for letting the fluid having flowed in from the inflow portion flow out, which is switchable between an open position enabling the fluid to pass through between the inflow portion and the fluid discharge pump and a closed position shutting off the fluid passing through between the inflow portion and the fluid discharge pump, wherein the open position and the closed position are switchable by rotating the tubular member on its axis which is perpendicular to the pressing direction; and a guiding member having a guiding portion roratably supporting the tubular member and guiding a switchover between the open position and the closed position of the tubular member.

7. The fluid container according to claim 6, wherein an opening portion for passing the fluid therethrough communicated with the inflow portion of the tubular member in the open position is formed in the guiding member downstream of the discharge pump, wherein the discharge pump comprises a resinous inflow valve mechanism for letting the fluid stored in the fluid-storing portion flow in and a resinous outflow valve mechanism for letting the fluid having flowed in from the inflow valve mechanism flow out, said resinous outflow valve mechanism comprising a nearly dish-shaped flexible valve portion having a diameter greater than a maximum width of the opening portion of the guiding member.

8. The fluid container according to claim 6, wherein the guiding member has a first regulating portion for stopping a rotation of the tubular member in the open position and a second regulating portion for stopping a rotation of the tubular member in the closed position.

9. The fluid container according to claim 6, wherein the fluid discharge pump comprises a resinous bellows member having the inflow opening and outflow opening and deforming from a stretched position in which a relatively large amount of fluid is stored inside the bellows member to a folded-up position in which a relatively small amount of fluid is stored inside it with a pressure being applied to the nozzle head.

* * * * *